United States Patent
Maekawa

(10) Patent No.: US 8,319,987 B2
(45) Date of Patent: Nov. 27, 2012

(54) IMAGE PROCESSING APPARATUS AND CONTROL METHOD FOR COMPRESSING IMAGE DATA BY DETERMINING COMMON IMAGES AMONGST A PLURALITY OF PAGE IMAGES

(75) Inventor: Koji Maekawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1099 days.

(21) Appl. No.: 11/564,426

(22) Filed: Nov. 29, 2006

(65) Prior Publication Data
US 2007/0127043 A1    Jun. 7, 2007

(30) Foreign Application Priority Data
Dec. 1, 2005    (JP) ................... 2005-347934

(51) Int. Cl.
G06F 3/12    (2006.01)
(52) U.S. Cl. ........ 358/1.15; 382/166; 382/176; 382/232
(58) Field of Classification Search .............. 382/100, 382/166, 176, 232, 284; 358/1.9, 3.28; 399/82
See application file for complete search history.

(56) References Cited

U.S. PATENT DOCUMENTS

| | | | |
|---|---|---|---|
| 6,301,386 B1 * | 10/2001 | Zhu et al. | 382/176 |
| 6,587,583 B1 * | 7/2003 | Kurzweil et al. | 382/166 |
| 6,628,833 B1 * | 9/2003 | Horie | 382/176 |
| 7,010,745 B1 * | 3/2006 | Shimada et al. | 382/176 |
| 7,292,710 B2 * | 11/2007 | Fan et al. | 382/243 |
| 7,324,711 B2 * | 1/2008 | Nagarajan et al. | 382/224 |
| 7,813,595 B2 * | 10/2010 | Nagarajan et al. | 358/462 |
| 2002/0037100 A1 * | 3/2002 | Toda et al. | 382/166 |
| 2003/0035147 A1 * | 2/2003 | Patton et al. | 358/3.28 |
| 2003/0035148 A1 * | 2/2003 | Patton et al. | 358/3.28 |
| 2003/0107753 A1 * | 6/2003 | Sakamoto | 358/1.9 |
| 2003/0210803 A1 * | 11/2003 | Kaneda et al. | 382/100 |
| 2004/0071478 A1 * | 4/2004 | Katamoto | 399/82 |
| 2004/0136586 A1 * | 7/2004 | Okamura | 382/137 |
| 2004/0205081 A1 * | 10/2004 | Chao | 707/101 |
| 2005/0050452 A1 * | 3/2005 | Weitzel et al. | 715/513 |
| 2005/0141035 A1 * | 6/2005 | Buckley | 358/1.18 |
| 2005/0172225 A1 * | 8/2005 | Kobashi et al. | 715/517 |
| 2005/0180648 A1 * | 8/2005 | Curry et al. | 382/243 |

(Continued)

FOREIGN PATENT DOCUMENTS

JP    10-051642    2/1998

(Continued)

*Primary Examiner* — Twyler Haskins
*Assistant Examiner* — Nicholas Pachol
(74) *Attorney, Agent, or Firm* — Cowen, Liebowitz & Latman, P.C.

(57) ABSTRACT

When generating one file from image data having plural pages, the present invention generates coded data of a background portion that is common to plural pages for sharing the coded data, thereby realizing a file compressed at high compression rate while maintaining image quality. For this, the apparatus reads plural pages. In the page processing, the read page image is separated into a text image and a background image. The background image is divided into predetermined pixel blocks, then comparison is performed with respect to a certain position between one page and a previous page in units of pixel block, and common pixel blocks are separated from page-unique pixel blocks. When reading of all pages is completed, a page image is generated with the text image and the page-unique background image. Thereafter, the background image common to plural pages is linked to corresponding pages for generating one file.

7 Claims, 32 Drawing Sheets

U.S. PATENT DOCUMENTS

| | | | | |
|---|---|---|---|---|
| 2005/0190981 | A1* | 9/2005 | Fan et al. | 382/243 |
| 2006/0045357 | A1* | 3/2006 | Schwartz et al. | 382/232 |
| 2006/0072830 | A1* | 4/2006 | Nagarajan et al. | 382/224 |
| 2007/0065040 | A1* | 3/2007 | Ming | 382/284 |
| 2007/0127771 | A1* | 6/2007 | Kaneda et al. | 382/100 |
| 2008/0055669 | A1* | 3/2008 | Nagarajan et al. | 358/462 |

FOREIGN PATENT DOCUMENTS

| | | | |
|---|---|---|---|
| JP | 10-215379 | | 8/1998 |
| JP | 2000-306103 | | 11/2000 |
| JP | 2002024799 A | * | 1/2002 |
| JP | 2003-244448 A | | 8/2003 |
| JP | 2003-333341 A | | 11/2003 |
| JP | 2004-260327 A | | 9/2004 |

* cited by examiner

F I G. 12
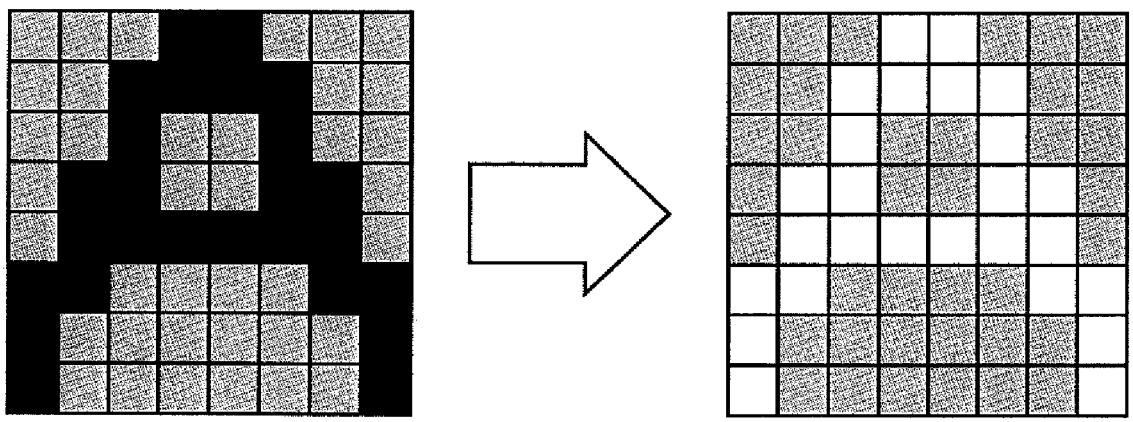

FIG. 16
| | PAGE COMPARISON IMAGE | | |
|---|---|---|---|
| ADDRESS | IMAGE DATA | PAGE DATA | OTHER DATA |
| 1.1 | 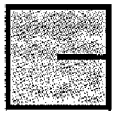 | 1 | |
| 2.1 |  | 1 | |
| ... | | | |

FIG. 17A

BINARY IMAGE OF
TEXT COLOR BLACK

Text Area data. ABCDEFGHIJKLM.
Abcd efgh i jkl mnop qrstu.

12   12

12                Table page 1 Table

Picture page 1 picture page 1

FIG. 17B

BINARY IMAGE OF
TEXT COLOR BLUE

Chapter1. page 1

Text Area 3

FIG. 17C

BINARY IMAGE OF
TEXT COLOR RED

Page 1. Text Area 1

BINARY IMAGE OF
TEXT COLOR GREEN

Text Area 2

Chapter1. page1

Page1. Text Area1
Text Area data. ABCDEFGHIJKLM.
Abcd efgh i jkl mnop qrstu 12  12  12      Text Area 2.
                Table
12  12  12
page1 Table Text Area 3.
Picture page1 picture page1

FIG. 22

$$\text{SIMILARITY LEVEL}(B1:B2) = \frac{\vec{B1} \cdot \vec{B2}}{|\vec{B1}| \cdot |\vec{B2}|} \times 100$$

$$= \frac{\sum_{i=1}^{n} (B1(c)i \cdot B2(c)i)}{\left(\sum_{i=1}^{n} (B1(c)i)^2 \cdot \sum_{i=1}^{n} (B2(c)i)^2\right)^{1/2}} \times 100$$

B1 : IMAGE CHARACTERISTIC AMOUNT OF COMPARISON-BASE IMAGE BLOCK
B2 : IMAGE CHARACTERISTIC AMOUNT OF COMPARISON-TARGET IMAGE BLOCK
B1(c)i : PIXEL DATA OF COMPARISON-BASE IMAGE BLOCK
B2(c)i : PIXEL DATA OF COMPARISON-TARGET IMAGE BLOCK
n : NUMBER OF COMPARING PIXELS (256 PIXELS)

FIG. 23A
- COMMON COMPARISON IMAGE
| ADDRESS | IMAGE DATA | PAGE DATA | OTHER DATA |
|---|---|---|---|
| 1.1 |  | 1, 2 | |
| 2.1 |  | 1, 2 | |
| ... | | | |
FIG. 23B
- PAGE COMPARISON IMAGE
| ADDRESS | IMAGE DATA | PAGE DATA | OTHER DATA |
|---|---|---|---|
| 2.8 |  | 1 | |
| |  | 2 | |
| ... | | | |

FIG. 24
INPUT IMAGE OF THIRD PAGE
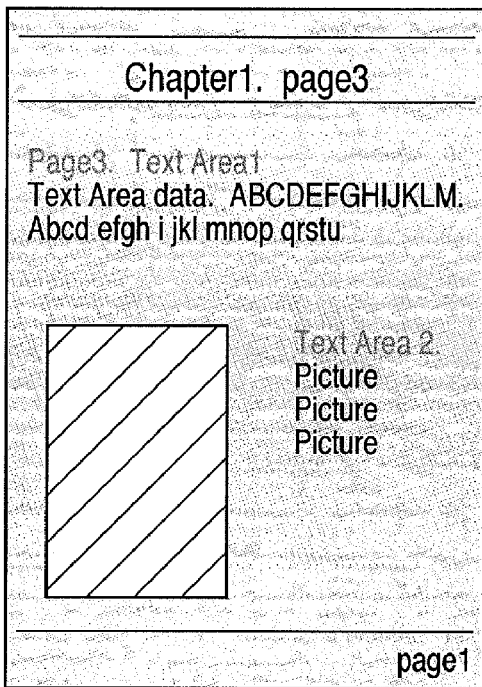
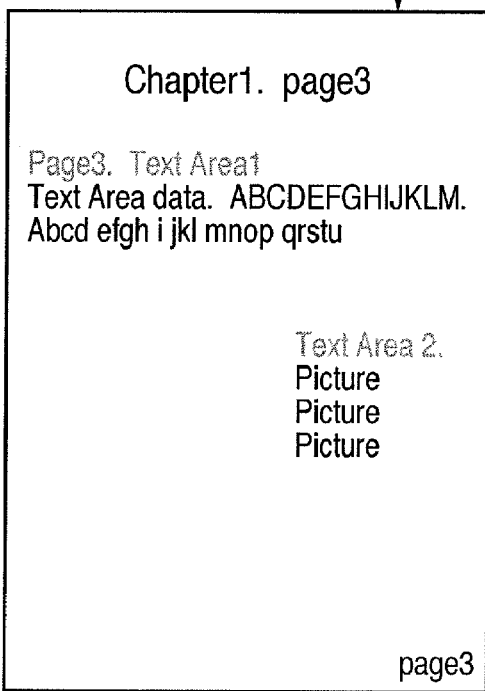
BINARY IMAGE OF THIRD PAGE
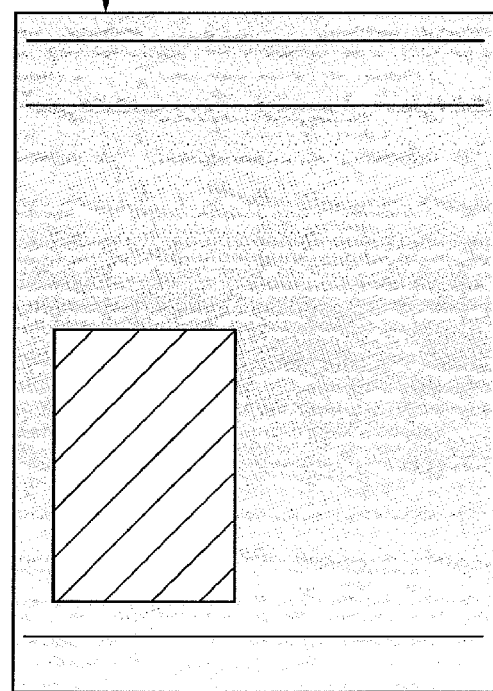
BACKGROUND IMAGE OF THIRD PAGE

FIG. 25A
- COMMON COMPARISON IMAGE
| ADDRESS | IMAGE DATA | PAGE DATA | OTHER DATA |
|---------|------------|-----------|------------|
| 1. 1 |  | 1, 2, 3 | |
| 2. 1 |  | 1, 2, 3 | |
| ... | | | |
| 7. 11 |  | 2, 3 | |
FIG. 25B
- PAGE COMPARISON IMAGE
| ADDRESS | IMAGE DATA | PAGE DATA | OTHER DATA |
|---------|------------|-----------|------------|
| 2. 8 |  | 1 | |
| |  | 2 | |
| ... |  | 3 | |
| 7. 11 |  | 1 | |

F I G. 32
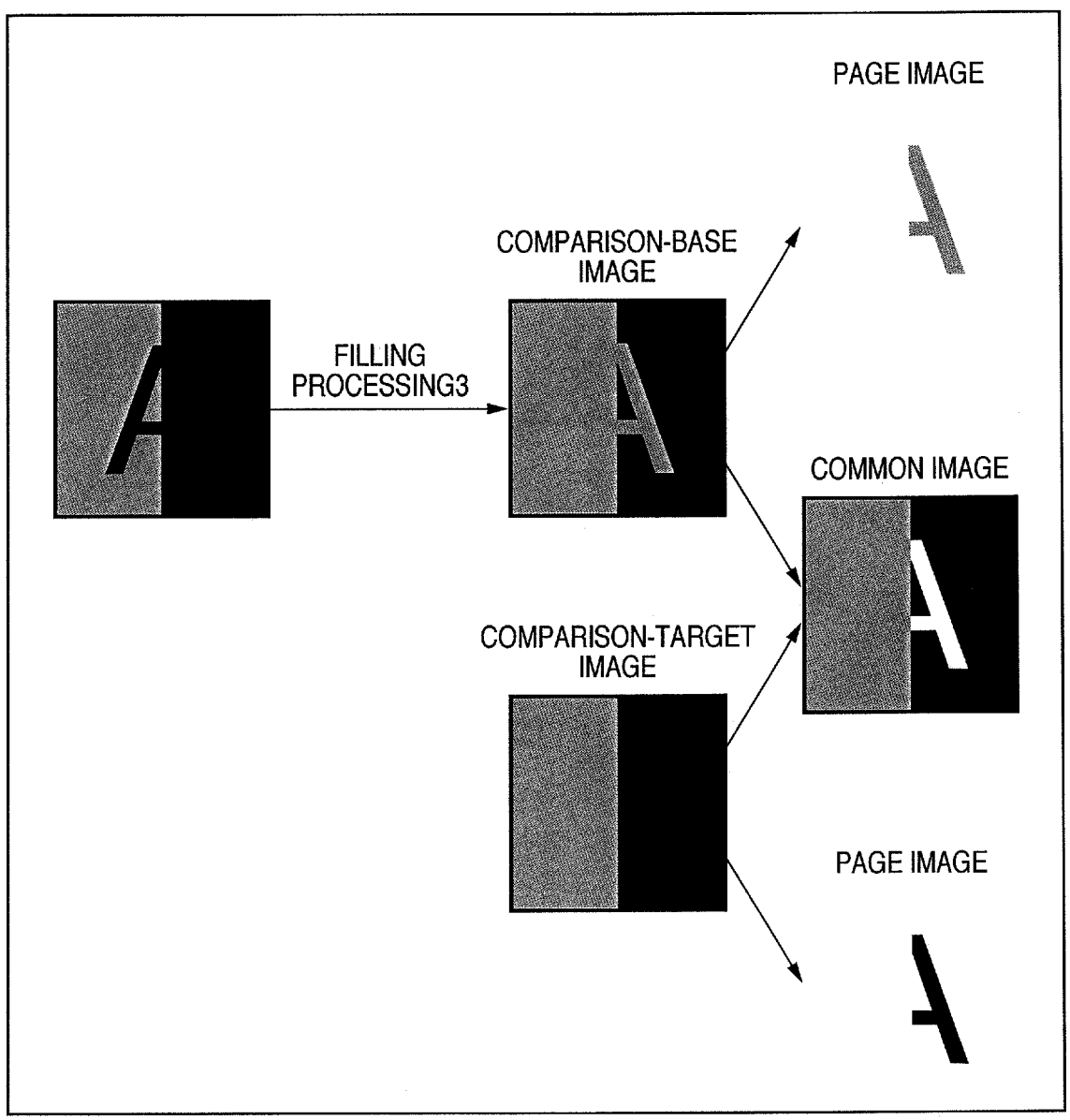

IMAGE PROCESSING APPARATUS AND CONTROL METHOD FOR COMPRESSING IMAGE DATA BY DETERMINING COMMON IMAGES AMONGST A PLURALITY OF PAGE IMAGES

BACKGROUND OF THE INVENTION

1. Field of the Invention

The present invention relates to a technique of performing compression coding on a document image constructed with plural pages, and generating one file.

2. Description of the Related Art

In recent years, electronic image data read and acquired by a scanner from an original paper document is kept (stored) in a computer and reused.

However, image data (particularly color image data) has a large data size. In the case in which image data is stored on a server provided on a network, a network traffic problem occurs. Furthermore, to store the data, a large-capacity storage device is required.

To address these issues, a number of image data compression techniques have been proposed. If image data is compressed at an extremely high compression rate, image quality deteriorates significantly, causing a problem in which the text portion that is considered important in many business documents becomes illegible.

To solve this problem, the following techniques are known: the technique of changing the compression method in accordance with a characteristic or attribute of the image data (e.g., Japanese Patent Application Laid-Open No. 10-51642 and No. 10-215379), and the technique of extracting layer structures of an image and performing efficient compression for each of the layers (Japanese Patent Application Laid-Open No. 2000-306103).

According to these techniques, one sheet of document image data can be compressed to image data of a small data size, while maintaining reasonable image quality. Assume that one page of uncompressed image data can be compressed as small the amount as 1/10. In this case, a storage device having a certain capacity can store and manage 10 times as large the document volume. Although the compression rate can further be increased, an extremely high compression rate results in unclear text in a decoded document and makes the texts difficult to read.

According to the techniques proposed so far, document images are stored and managed in units of sheet and are independent of each other, thus having no cause-and-effect relationship.

Meanwhile, a document prepared for presentation used in an office conference or the like is often constructed with plural pages, and many of them are generated by a PC. In the case of such documents prepared for a presentation, a background image is often provided to each page for better appearance.

SUMMARY OF THE INVENTION

The inventor of the present invention has focused attention to the point that the background images of respective pages are highly likely the same in a case of such document prepared for presentation. The present invention takes advantage of this feature of the document having the same background image, and provides a technique for further improving the compression rate while maintaining high image quality.

To solve the above-described problem, an image processing apparatus according to the present invention has, for instance, the following configuration. More specifically, the present invention provides an image processing apparatus that performs compression coding on image data and stores the image data as an electronic file, comprises an input unit adapted to input image data corresponding to plural pages, a first separation unit adapted to separate the inputted image data of each page into a text image and a background image, a first compression coding unit adapted to perform binarization on the separated text image and perform compression coding for binary images, a second separation unit adapted to separate the background image into a common background image portion and a page-unique background image portion by comparing the separated background images of respective pages, a second compression coding unit adapted to perform compression coding for multi-valued images on the common background image portion and the page-unique background image portion, and a file generation unit adapted to generate one electronic file that can describe plural pages, by associating each page with respective coded data of a page-unique text portion and a page-unique background image portion, and by associating the common background image portion of respective pages with a link to coded data of one common background image.

According to the present invention, when a file is generated from image data having plural pages, coded data of a background portion that is common to plural pages is generated and shared. Accordingly, a file compressed at high compression rate can be generated while maintaining high image quality.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is an explanatory view of text deletion processing according to the embodiment;

FIG. 16 is a view showing how block images on the first page are stored;

FIGS. 17A to 17D are views showing text images separated in units of color;

FIG. 18 is a view showing a binarized result of a text image;

FIG. 22 shows an arithmetic expression of a pixel block similarity level;

FIGS. 23A and 23B are views showing how pixel blocks of a page-unique portion and a common portion in a background image are stored upon completion of second page processing;

FIG. 24 is an explanatory view of a background image and a text image of the third page separated from each other;

FIGS. 25A and 25B are views showing how pixel blocks of a page-unique portion and a common portion in a background image are stored upon completion of third page processing;

FIG. 32 shows how segmentalization is applied in the fourth embodiment.

DESCRIPTION OF THE EMBODIMENTS

Preferred embodiments of the present invention will now be described in detail in accordance with the accompanying drawings.

First Embodiment

Figure 1:
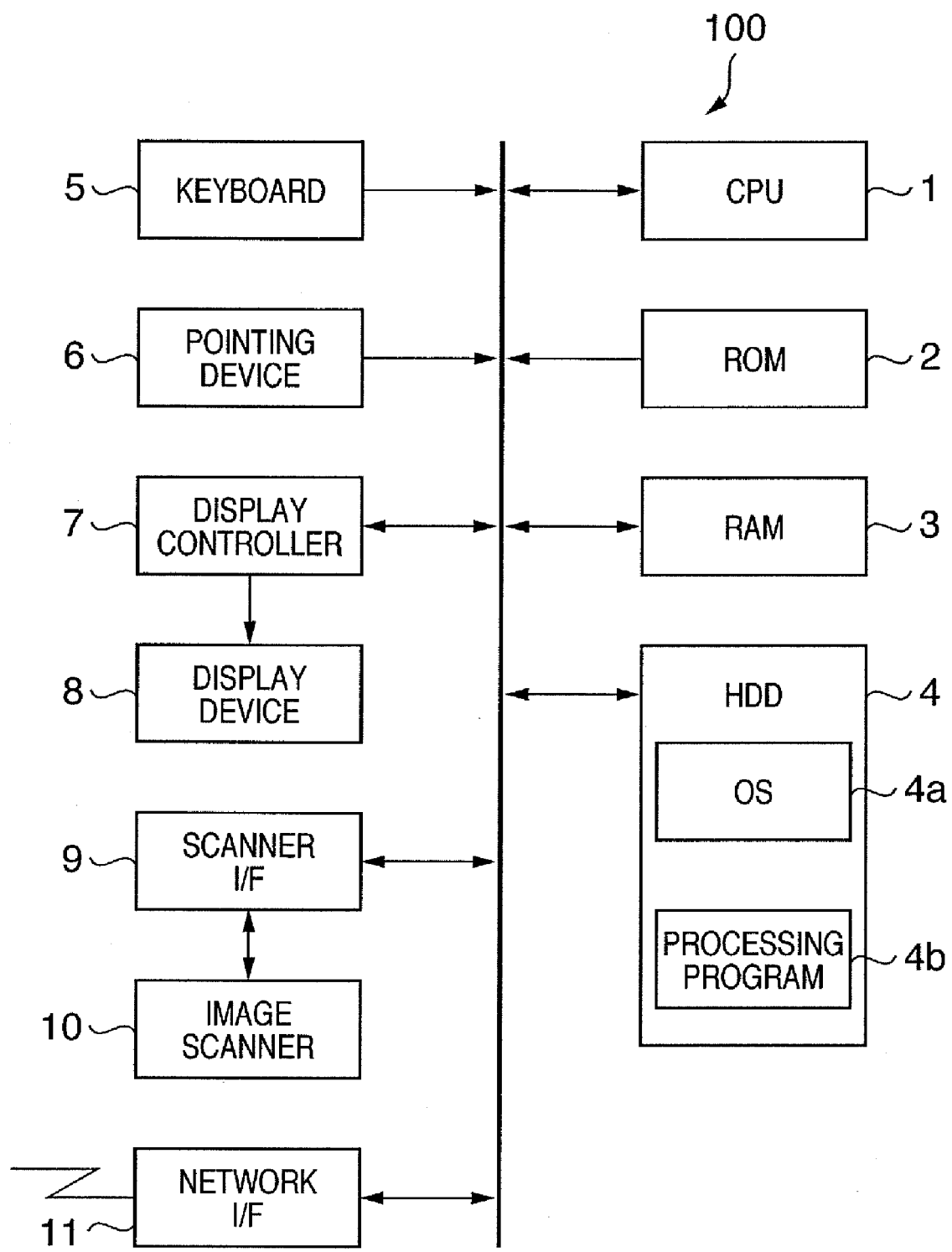
FIG. 1 is a block diagram showing a construction of a data processing apparatus according to an embodiment of the present invention.

FIG. 1 is a block diagram showing a construction of a data processing apparatus 100 according to the present embodiment. Assume that the data processing apparatus 100 according to the present embodiment has a hardware configuration of a general-purpose data processing apparatus, e.g., a personal computer (PC).

In FIG. 1, numeral 1 denotes a CPU for controlling the entire apparatus; 2, ROM for storing a boot program and BIOS; and 3, RAM used as a work area of the CPU 1. In the RAM, an operating system (OS), various processing programs, and furthermore data are read and processed by the CPU 1. Numeral 4 denotes a hard disk device (HDD) serving as an external storage device. As shown in FIG. 1, an OS 4a and a processing program 4b according to the present embodiment are installed in the HDD 4. The HDD 4 also stores data files generated by various application programs and image data files inputted by an input device, such as a scanner, which will be described later. Numeral 5 denotes a keyboard; and 6, a pointing device such as a mouse. Numeral 7 denotes a video memory and a display controller which performs rendering processing on the video memory, image data reading from the video memory at predetermined timing, and video signal output to a display device 8. The display device 8 may be of a CRT, a liquid crystal display device or the like. Numeral 9 denotes a scanner interface (I/F) for connecting an image scanner 10 that reads an original document. Typical examples of the scanner I/F 9 include an SCSI interface, a USB interface, and the like. Assume that the image scanner 10 comprises an auto-document feeder (ADF) that has a function for sequentially conveying plural sheets of document to a reading position and reading the document. Numeral 11 denotes a network interface (I/F) such as an Ethernet.

In the above-described construction, when the power of the data processing apparatus 100 is turned on, the CPU 1 executes the boot program stored in the ROM 2 and loads the OS from the HDD 4 to the RAM 3 to function as a data processing apparatus. Thereafter, when a user operates the keyboard 5 and the pointing device 6 to start the processing program 4b (load the program in the RAM 3 and execute), the apparatus functions as a device that performs image data compression processing according to the present embodiment.

When the processing program 4b is executed, an original document having plural pages set on the image scanner 10 are sequentially read in accordance with a user's instruction, and the read image data is stored in the RAM 3. Then, processing that will be described later is performed on image data of the respective pages, thereby generating one file corresponding to the original document having plural sheets, and the file is stored in the HDD 4.

Figure 2:
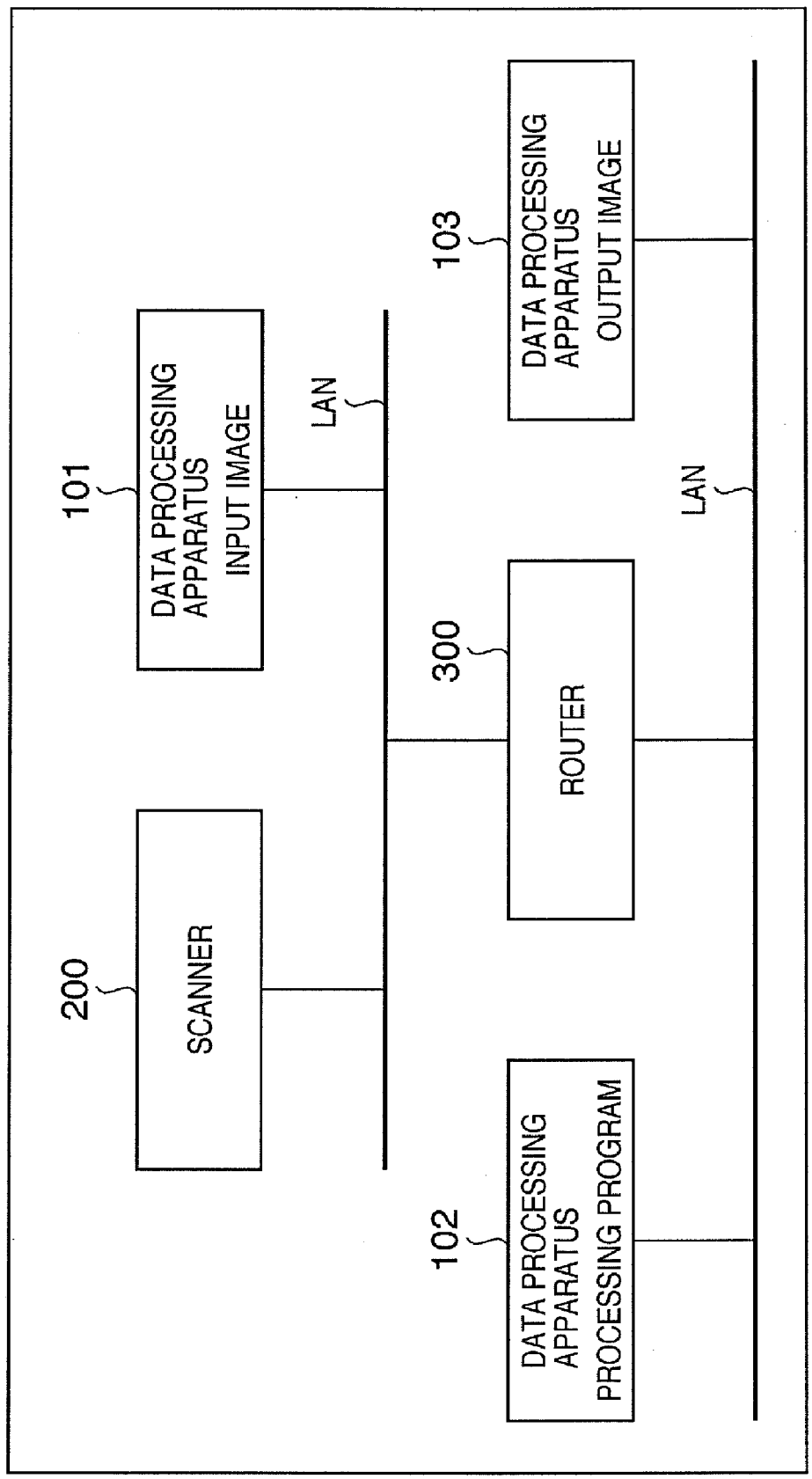
FIG. 2 is a diagram showing an example of a network system to which the embodiment is applicable.

Note that although the above description provides an example of a stand-alone apparatus, the image scanner and the apparatus (a database server or a file server) where the generated compressed data file is ultimately stored may be provided on a network. FIG. 2 shows an example thereof.

In FIG. 2, the data processing apparatus 101 causes the scanner 200 on the network to read an original document image, and receives the read image data. The data processing apparatus 101 sequentially transfers the read image data to a data processing apparatus 102 through a router 300. The data processing apparatus 102 executes the above-described compression processing on the received image data, and transfers the data file generated as a result of compression to a data processing apparatus 103. The data processing apparatus 103, which serves as a database server or a file server, stores and keeps the transferred data file. In the construction shown in FIG. 2, the data processing apparatus 102 performs the processing similar to that of FIG. 1. As can be easily understood from the construction in FIG. 2, this configuration can be realized in the environment where plural LANs are connected, thus can be realized through, e.g., the Internet.

To simplify the description, the following description will be given on the construction shown in FIG. 1. However, as described with reference to FIG. 2, it is apparent that the processing can be executed through a network.

Hereinafter, the processing content of the processing program 4a executed by the data processing apparatus 100 according to the present embodiment is described with reference to the flowchart in FIG. 3. Note that this processing is executed when the processing program 4b (application) is started and original document reading is instructed by the pointing device 6 on the GUI screen (not shown) provided by the program.

In step S101, one of the plural sheets of original document set on the scanner 10 is read. The pixels constituting the page image data of the read one sheet of original document are multi-valued color image data where R, G and B are respectively expressed by 8 bits. In this embodiment, the image data expressed in RGB color space is converted to YCbCr (luminance, color difference) space. Since the conversion that is realized by matrix operation is well-known, description thereof is omitted.

Figure 4:
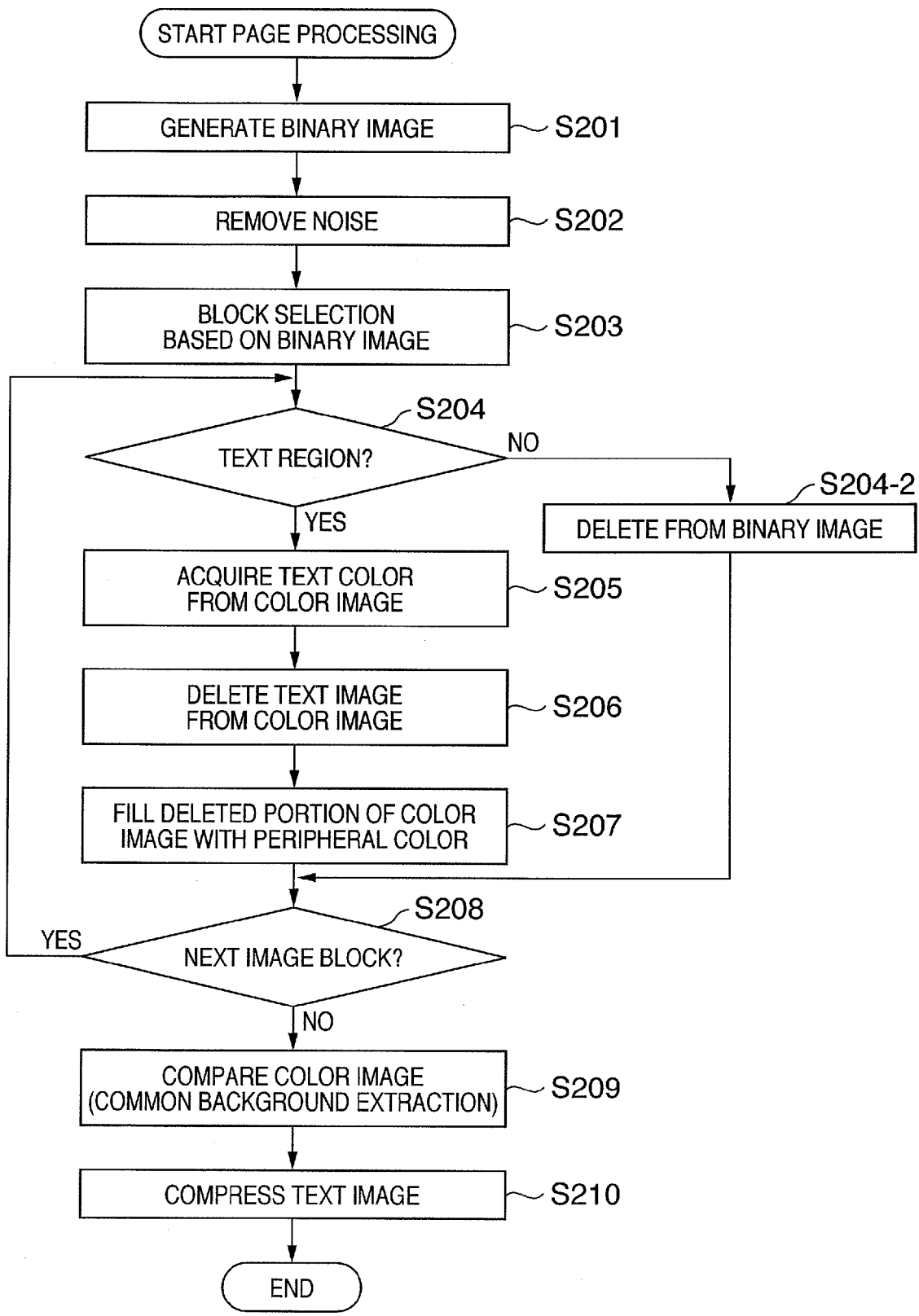
FIG. 4 is a flowchart of the page processing shown in FIG. 3.

In step S102, page processing is executed on the read page image data. The page processing is described in detail with reference to the flowchart in FIG. 4.

In step S201, color image data expressed in YCbCr space is binarized, thereby generating binary image data.

Figure 6:
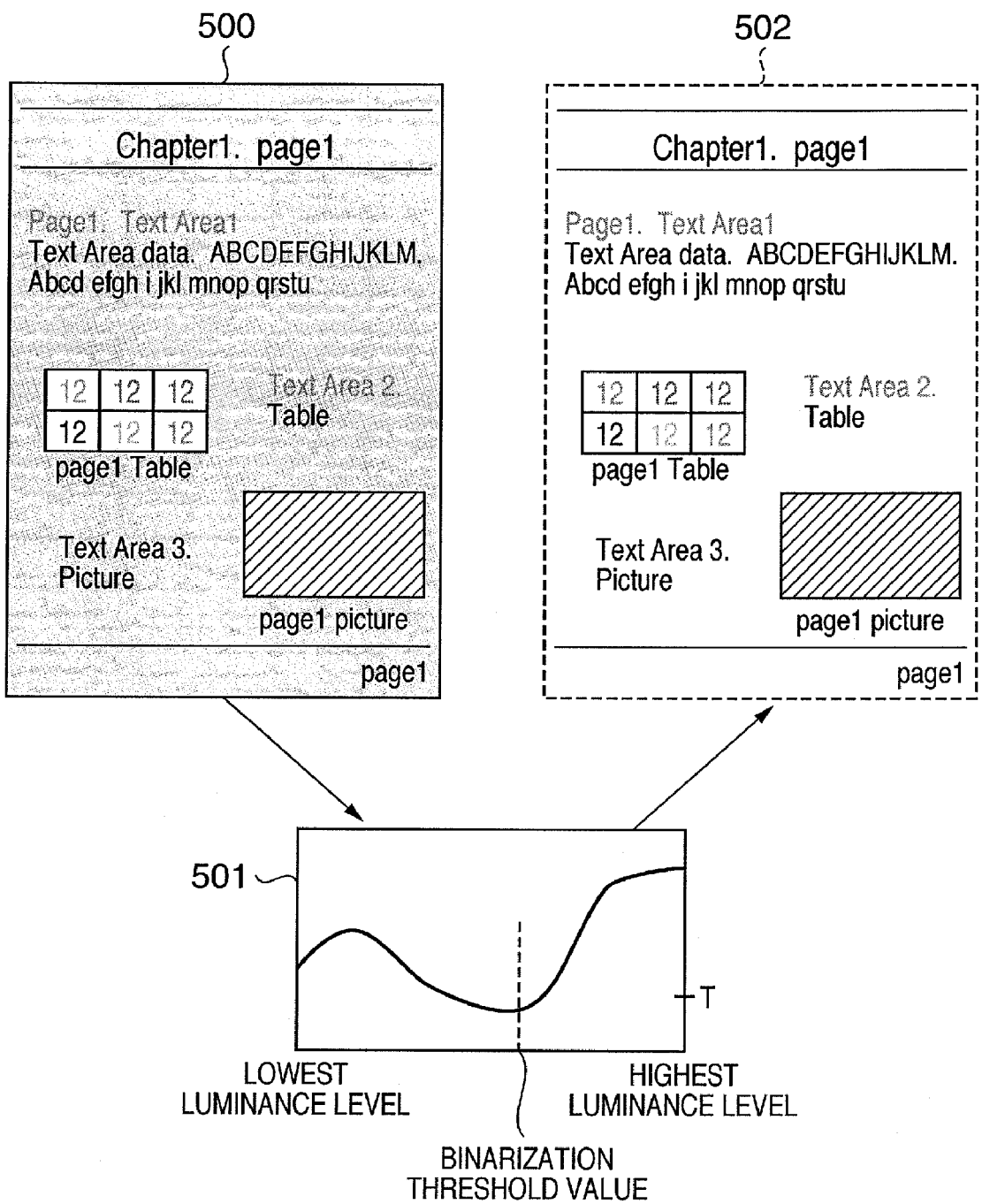
FIG. 6 is a view showing binary image generation processing based on original image data according to the embodiment.

FIG. 6 is an explanatory view of binary image generation processing based on color image data. Y values representing a luminance component are extracted from the inputted original image data in YCbCr space, and a histogram 501 is generated. Since the histogram represents the luminance component, the number of pixels constituting texts and line drawings is by far smaller than the number of pixels constituting the background image. Further, since the background image has a higher luminance (lower density) level than that of texts and line drawings, when the distribution line of the histogram is followed from the highest luminance level to a low luminance level, the value that first goes below the threshold value T is acquired as a local minimal value, and the luminance of the local minimal value is decided as a threshold value used in binarization.

Pixels equal to or lower than the binarization threshold value decided in the foregoing manner are processed as black pixels, and pixels higher than the threshold value are processed as white pixels, thereby obtaining the binary image data 502 shown in FIG. 6.

In step S203, noise removal processing is performed on the generated binary image data, thereby producing image data that is subjected to block selection. The noise removal processing is equivalent to isolated pixel removing. This is described with reference to FIG. 7. Note that each pixel of the binary image data is expressed by 1 bit. For descriptive purpose, 1 expresses a black pixel and 0 expresses a white pixel herein.

Assume that the pixel of interest is P(x, y). The condition of an isolated pixel is as follows:
condition: P(x, y)="1" and peripheral 8 pixels {P(x, y−1), P(x, y+1), P(x−1, y−1), P(x−1, y), P(x−1, y+1), P(x+1, y−1), P(x+1, y), P(x+1, y+1)} are all "0".

When the above condition is satisfied, the pixel of interest P(x, y) is determined as an isolated pixel, and the value of the pixel of interest P(x, y) is converted to "0".

Figure 7:
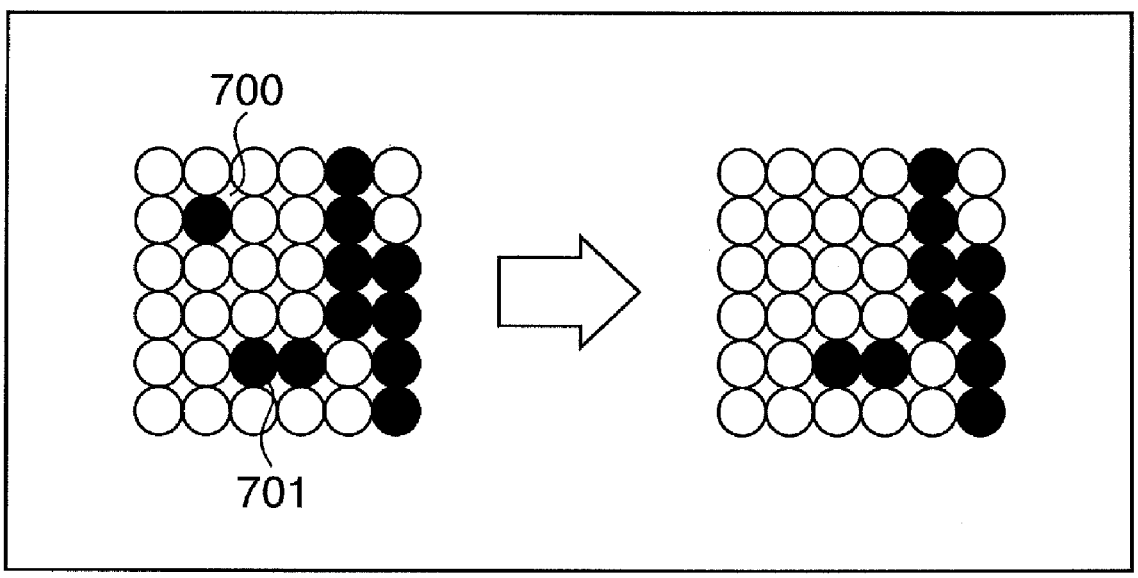
FIG. 7 is an explanatory view of isolated pixel removing processing according to the embodiment.

When the pixel of interest is numeral 700 in FIG. 7, the pixel is determined as an isolated pixel and is converted to a white pixel. When the pixel of interest is numeral 701, since one of the peripheral pixels, i.e., the neighboring pixel on the right is "1", the pixel of interest 701 is determined not to be an isolated pixel and the original binary data is maintained.

The above processing is sequentially performed with respect to the pixel of interest P(x, y) by updating x and y in accordance with raster scanning, thereby executing binarization based on the luminance component of the inputted image.

In step S203, the binary image data, on which above-described noise removal processing has been performed, is inputted, then block selection processing (image region division processing that divides the image into blocks in units of attribute) is performed, and block information and attribute information are added to the image data before being outputted.

In block selection processing, an attribute is given to the image region based on the size of the black pixel group included in the binary image data and uniformity of the image block. In this manner, from the page data of the binary image, it is possible to obtain somewhat cohesive image blocks consisting of titles, texts, graphics, tables, and images (pictures), as well as its attribute, positional information and size of the block.

Figure 8:
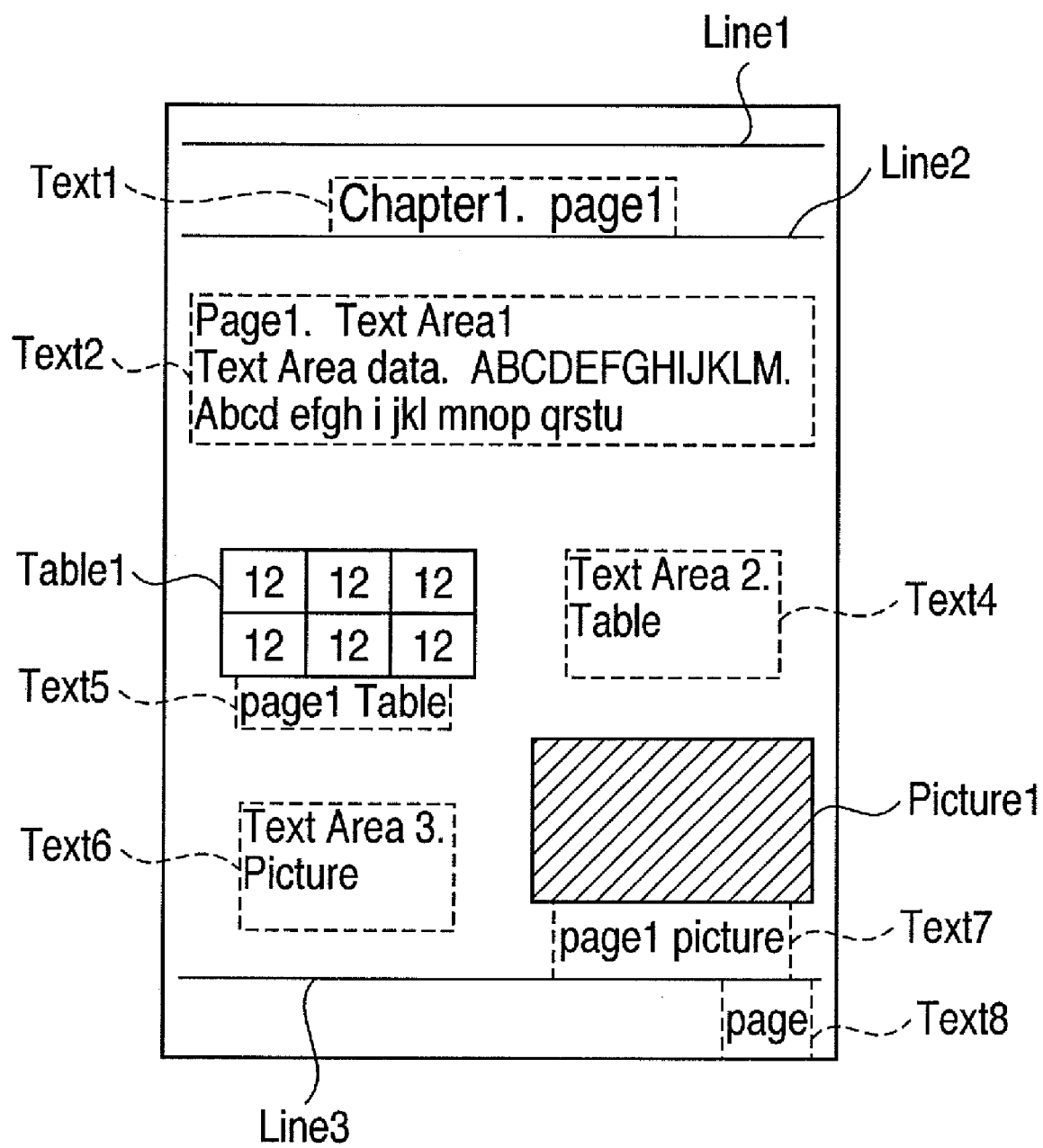
FIG. 8 is an explanatory view of image region division processing from a binarized result according to the embodiment.

FIG. 8 shows the result of image region division using block selection. In FIG. 8, the inputted image data is divided into block regions including eight text regions Text 1-8, one table region Table 1, and one picture region Picture 1, as well as three line regions Line 1-3.

Figure 9A:
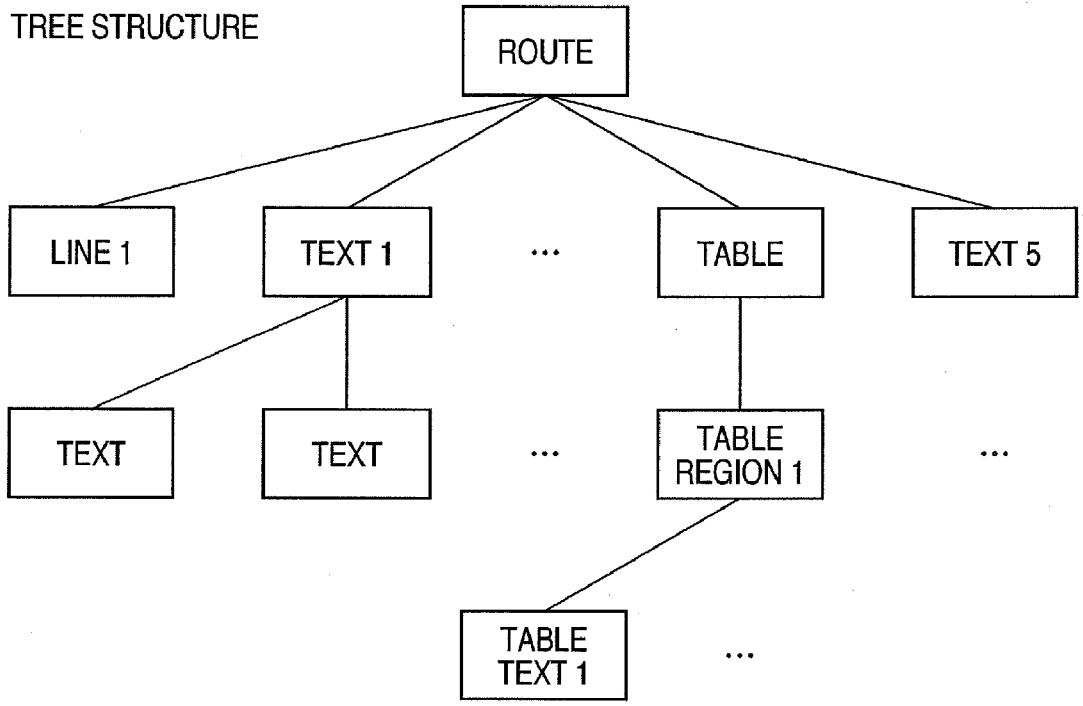
FIGS. 9A and 9B show a tree structure where respective nodes have data of respective regions generated by image region division, and a data content of each node.
Figure 9B:
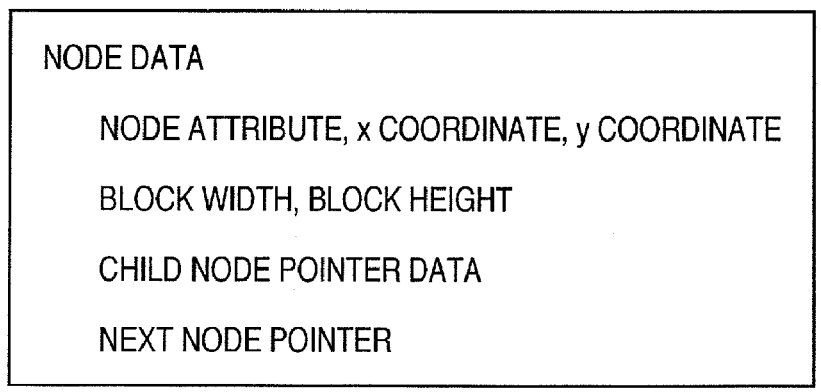

FIG. 9A shows a logical structure (tree structure) obtained as a result of block selection processing. With the image page being a route, processing for text images is performed on all block data obtained herein. As shown in FIG. 9B, each node includes attribute information indicative of whether the node is a text region or a table region, the coordinate position (x, y) of the top left corner of the region, and the width and height of the region given that the region is rectangular. With respect to a text region, in order to manage the region having a text image as a child node, each node includes a pointer to the child node, and furthermore, a pointer to the next node. Since the table region also includes texts, it has a similar structure.

In step S204, one region is extracted and it is determined whether or not the region is a text region. This is determined by referring to the node attribute in the logical structure of the block selection shown in FIG. 9B.

As a result of determination, if it is determined as a text region, processing in step S205 is performed. If it is determined as a non-text region, processing in step S204-2 is performed. In this embodiment, since the attribute of the first node (left end node) is a line as shown in FIG. 9A, the region is determined as a non-text region, and processing in step S204-2 is performed.

Figure 10:
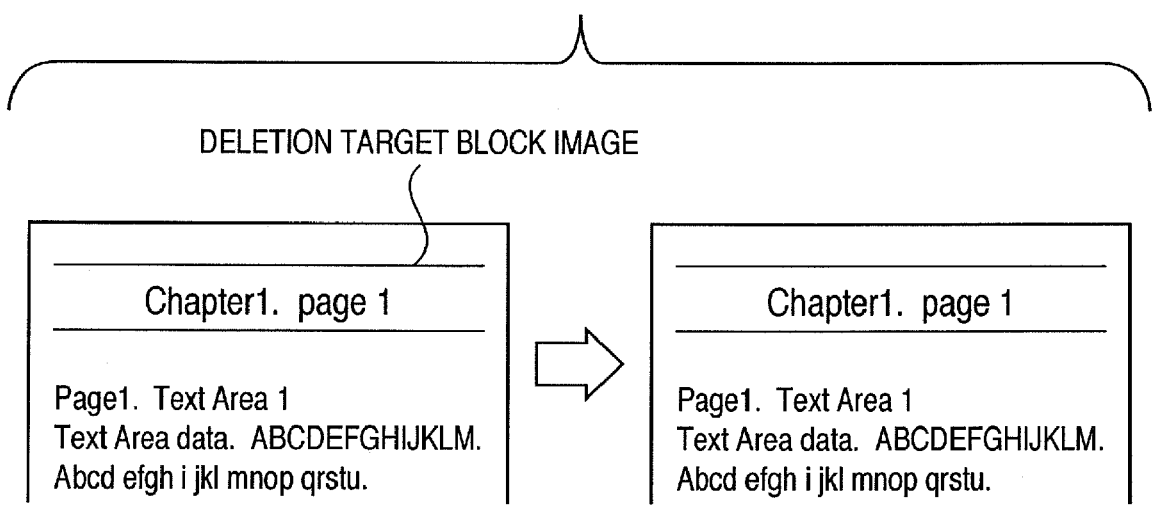
FIG. 10 is an explanatory view of non-text image deletion processing according to the embodiment.

FIG. 10 is an explanatory view of non-text image deletion from a binary image. Based on node data of the block selection, an image region to be deleted is specified, and the specified image is deleted from the binary image data.

When processing on the target block is completed, step S208 is executed and a node of the next block selection is acquired. If node data cannot be acquired, in other words, if processing completion on all blocks is determined, processing in step S209 is executed. Herein assume that there is a next node, and a description is provided on a case where the control returns to step S204.

In step S204, it is again determined whether the node attribute of the block selection subjected to processing is a text region or a non-text region. If the node of interest is a text region, processing in step S205 is executed.

In step S205, node data of the block selection in a text region is analyzed to acquire text node data which is a final unit of a text block. Color data is added to the acquired text data.

Figure 11:
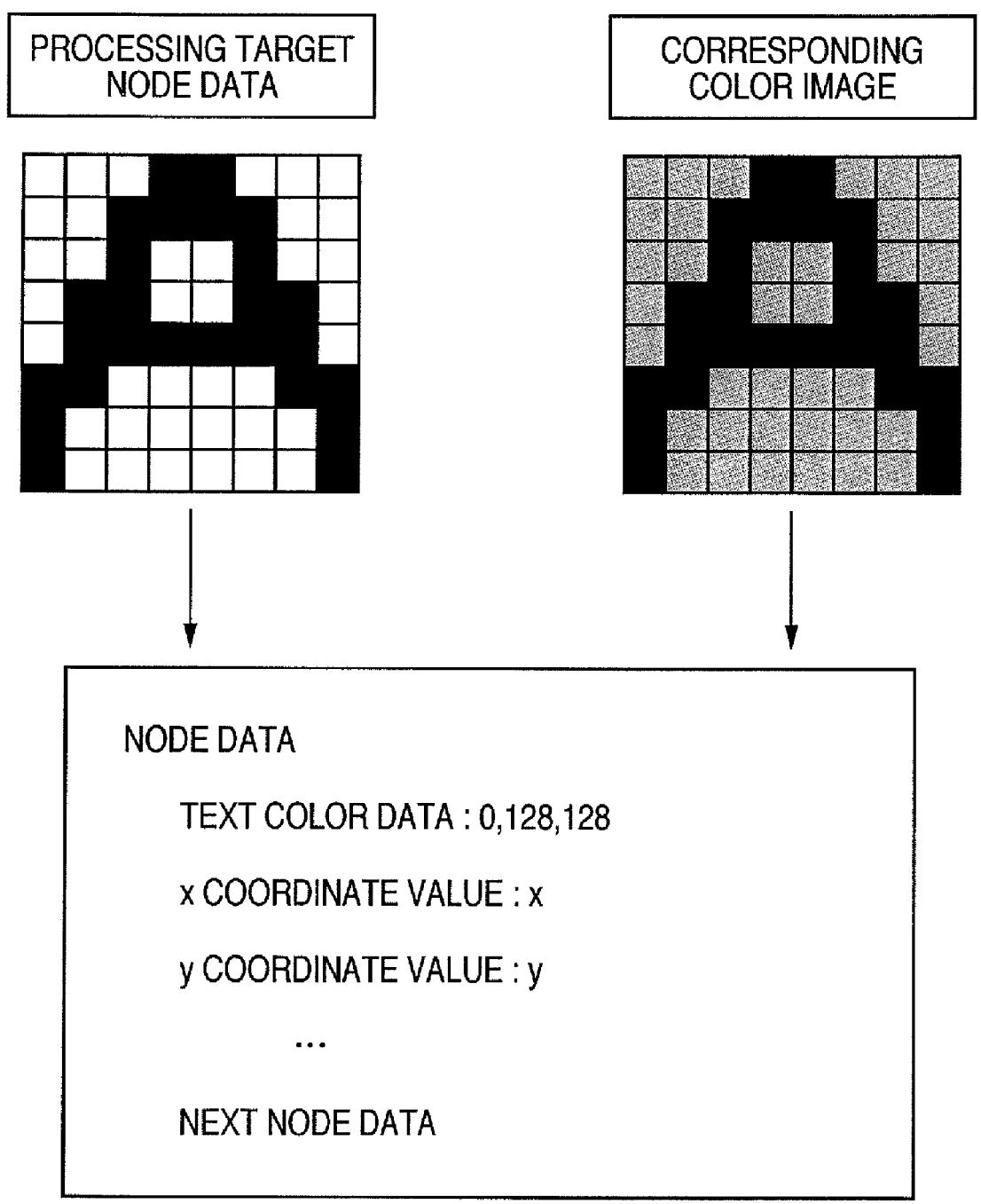
FIG. 11 is an explanatory view of text color decision processing according to the embodiment.

In text color determination processing, as shown in FIG. 11, color data of each pixel constructing the text corresponding to the node data subjected to current processing is extracted from the original YCbCr image data, and a text color is determined and added to the node data.

In the case of FIG. 11, since the color of the target text is black, text color data [0, 128, 128] (values of Y, Cb, Cr) is added to the node data.

In step S206, based on information corresponding to the node that is determined as a text in step S205, each pixel constructing the target text image is deleted from the original YCbCr color image. FIG. 12 is an explanatory view of text image deletion. Pixel data corresponding to the pixel position having "1" in the binary image is deleted from the YCbCr color image.

Figure 13A:
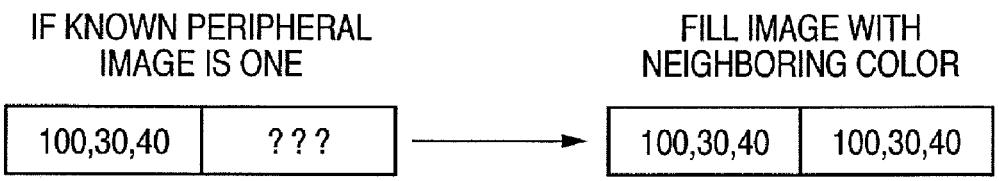
FIGS. 13A to 13C are explanatory views of text image deleted portion filling (painting) processing according to the embodiment.
Figure 13B:
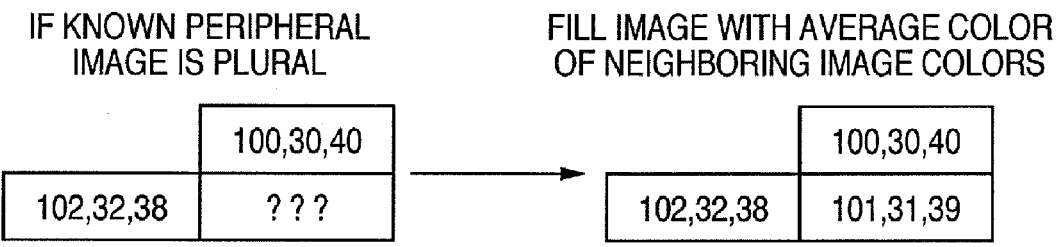
Figure 13C:
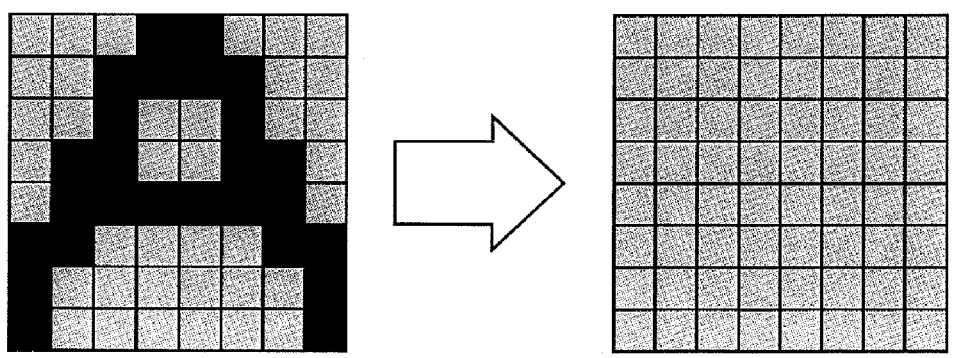

In step S207, filling (painting the blank in the deleted portion) is performed on the color image where text image is deleted, using the color data of peripheral pixels. As shown in FIG. 13A, if the known number of colors on the periphery of the filling-target pixel (pixel value (?, ?, ?)) is one, filling (painting) is performed with the same color as the peripheral pixels. If there are N types of colors in the neighboring pixels (two types in FIG. 13B), an average value of the color components is calculated to determine the color of the filling-target pixel. In this manner, the color of the pixels where the text is deleted is filled with the peripheral color, i.e., the background color.

Figure 14B:
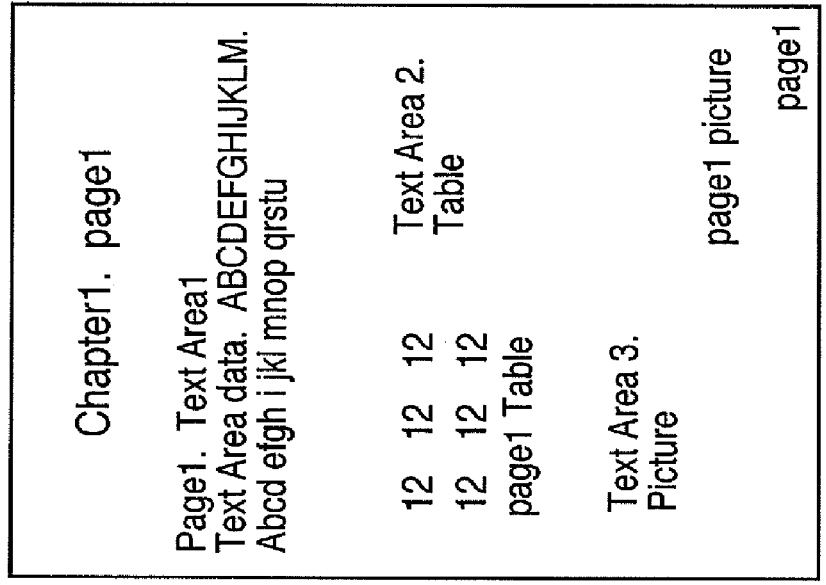
FIGS. 14A and 14B are views showing a background image and a text image separated from each other.
Figure 14A:
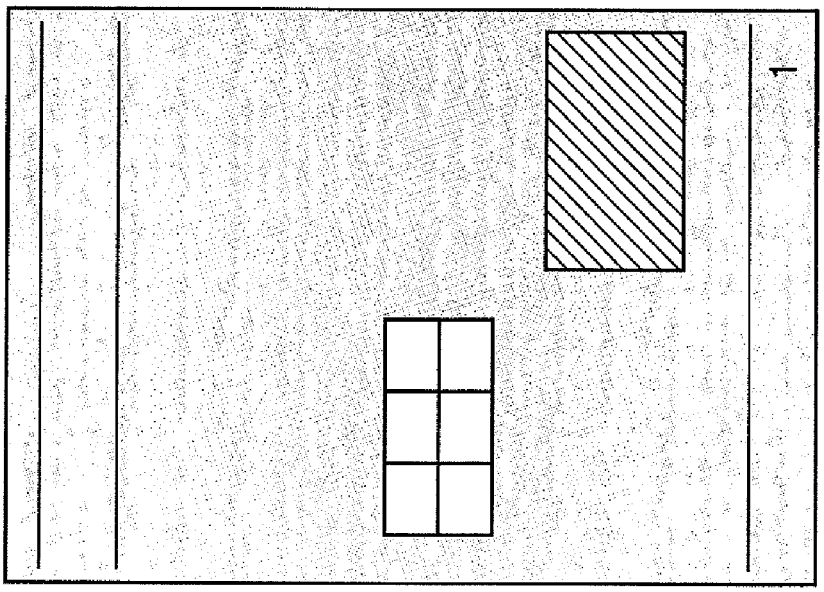

In the above-described manner, the processing of steps S204 to S208 is performed with respect to all the nodes. For a node having text attribute, the text color is determined, then the text image is deleted from the color image, and filling is performed with a peripheral color. For a node having non-text attribute, image data is deleted based on the binary image. Finally when processing on the page image is performed, a color image and a binary image shown in FIGS. 14A and 14B can be obtained. Texts are deleted from the color image, and filling is performed on the deleted text pixels. Image data other than texts is deleted from the binary image.

In step S209, comparison processing is performed between the color image where text removal and filling have been performed and the color image of the previous page where the similar processing has been performed.

Figure 5:
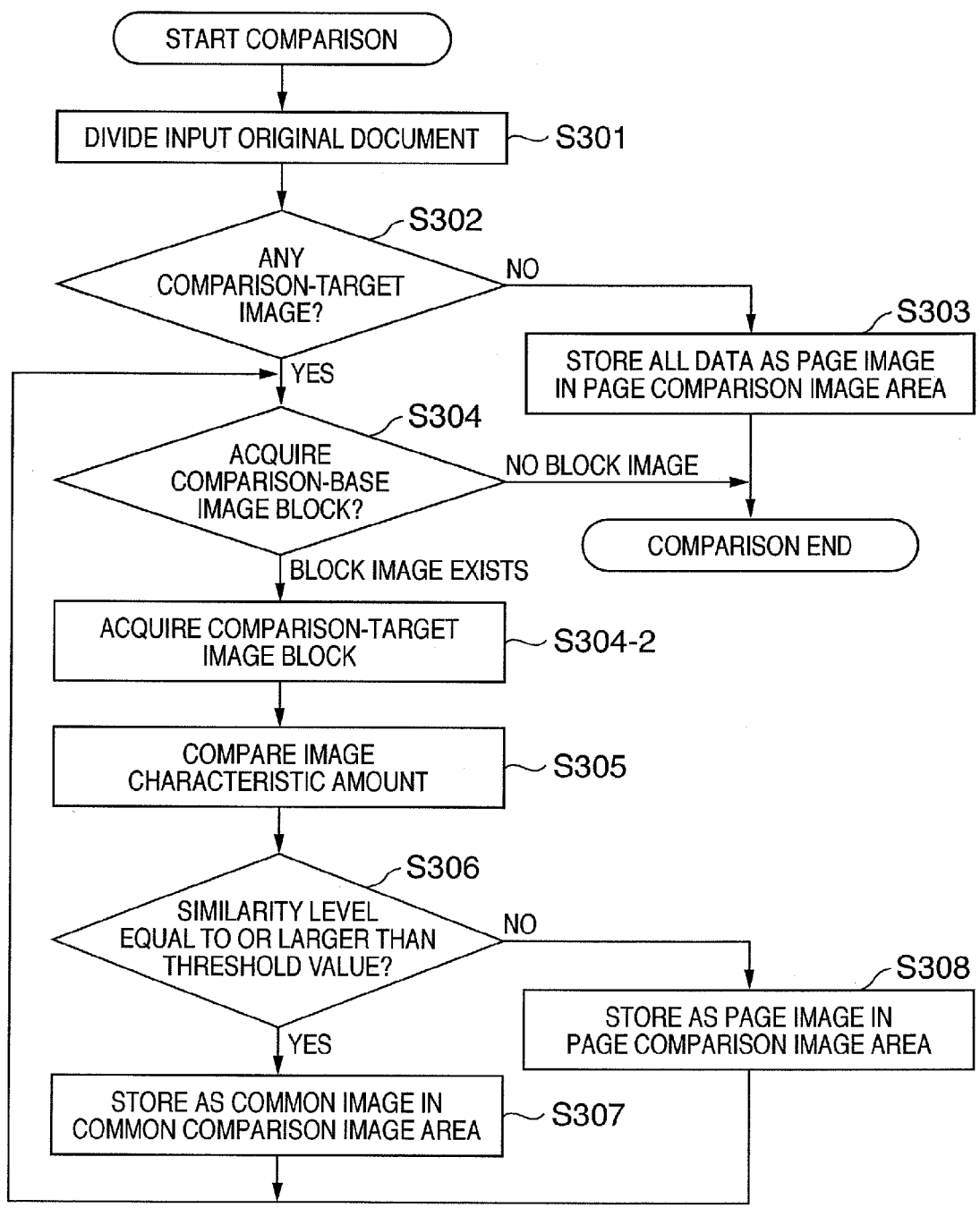
FIG. 5 is a flowchart of the comparison processing shown in FIG. 4.

Hereinafter, the color image comparison processing is described according to the flowchart in FIG. 5.

<Processing on First Page>

Figure 15:
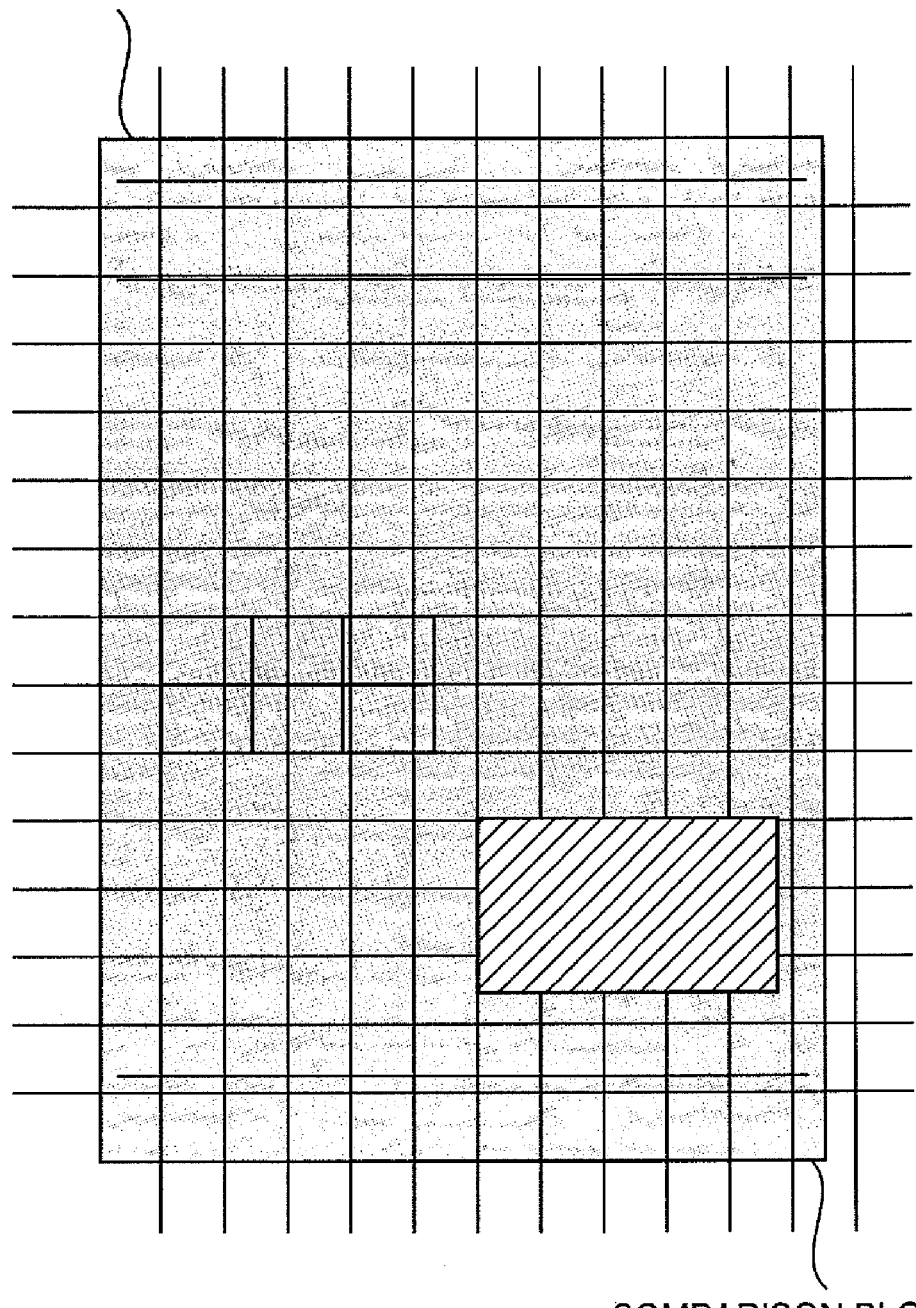
FIG. 15 is a view showing a background image which is divided into blocks.

In step S301, color image data of the target page, on which text removal and filling have been performed, is divided into blocks of an MCU (Minimum Coded Unit), which are the comparison unit. In this embodiment, assume that the MCU has a size of 16×16 pixel block. As shown in FIG. 15, image block addresses (1, 1) to (m, n) are assigned to respective blocks. Each of the divided blocks is the comparison unit.

In step S302, it is determined whether or not there is comparison-target image data. If there is no comparison-target image block data in the comparison image area, image processing in step S303 is performed. Assuming that the target page is the first page, since there is no comparison target, processing of step S303 is performed. Note that, besides the first page, if it is determined that there is no comparison target, the data in the comparison image area might have been flushed for some reason (e.g., lack of memory).

In step S303, all data of the target page is stored as a page image in the page comparison image area (secured in the RAM), and the control ends.

The page comparison image area has areas for storing addresses of respective block images, image data, page data and so forth as shown in FIG. 16.

Referring back to FIG. 4, in step S210, the text image is compressed. The text image compression is performed after a binary image is generated for each text color.

FIGS. 17A to 17D are explanatory views of image data generation in units of text color. Based on text color data of each node acquired in block selection, the same or similar text colors are put together as one text color, and binary image data is generated in units of color. The number of approximating colors is statistically about 16 at most.

As a result, binary image data of respective colors can be obtained as shown in FIGS. 17A to 17D. Each of these images is subjected to compression by MMR processing, which is a compression method appropriate for binary image data, and the page image as shown in FIG. 18 is stored as binary image data of the first page.

Figure 3:
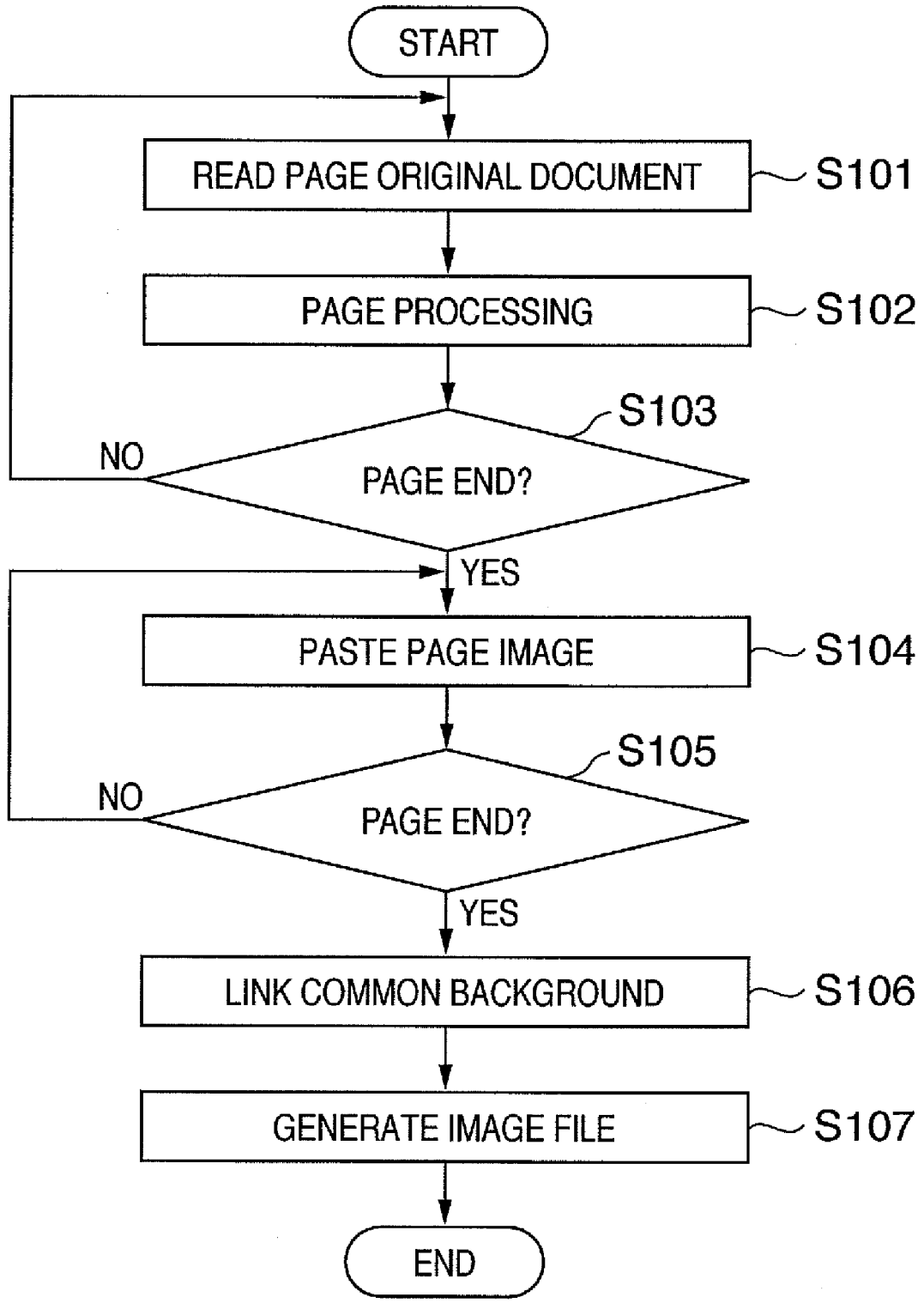
FIG. 3 is a flowchart showing the main processing of the data processing apparatus according to the embodiment.

When page processing described above is completed, it is determined in step S103 in FIG. 3 if there is a next page. Since there is still a page, image data of the second page is read and the processing similar to the first page is performed.

<Processing on Second Page>

Figure 19:
FIG. 19 is an explanatory view of a background image and a text image of the second page separated from each other.

FIG. 19 shows an inputted image of the second page as well as a binary image and a background image obtained as a result of processing in steps S201 to S208.

In step S301, the inputted background image is divided. Similarly to the first page, the image is divided into MCU blocks.

Figure 20:
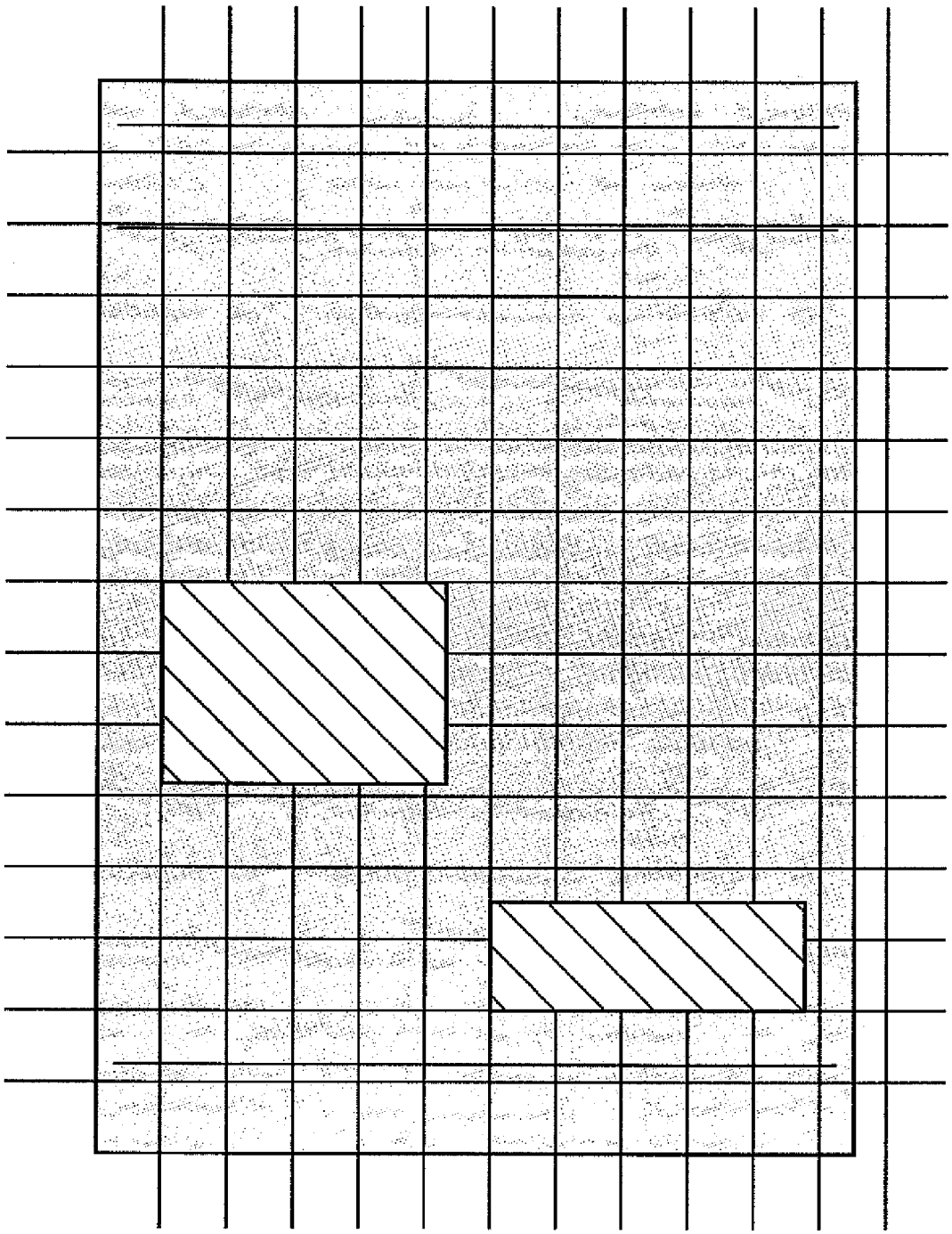
FIG. 20 is a view showing a background image of the second page which is divided into blocks.

The image data is divided in units of 16×16 pixels as shown in FIG. 20. Image block addresses (1, 1) to (m, n) are assigned to the divided blocks respectively, and comparison processing is performed in units of the divided block.

In step S302, it is determined whether or not there is a comparison-target image block in the comparison image area. Since the currently processed image is a second page, the page comparison image area contains image block data obtained in the previous processing. Therefore, comparison-base image block acquisition processing in step S304 is performed.

In step S304, the image block of the second page that serves as a comparison base, is acquired. When processing is completed on all image blocks of the comparison base, the comparison processing ends.

In step S304-2, image data to be compared with the block data of the original image is extracted from the common comparison image area and page comparison image area.

Figure 21:
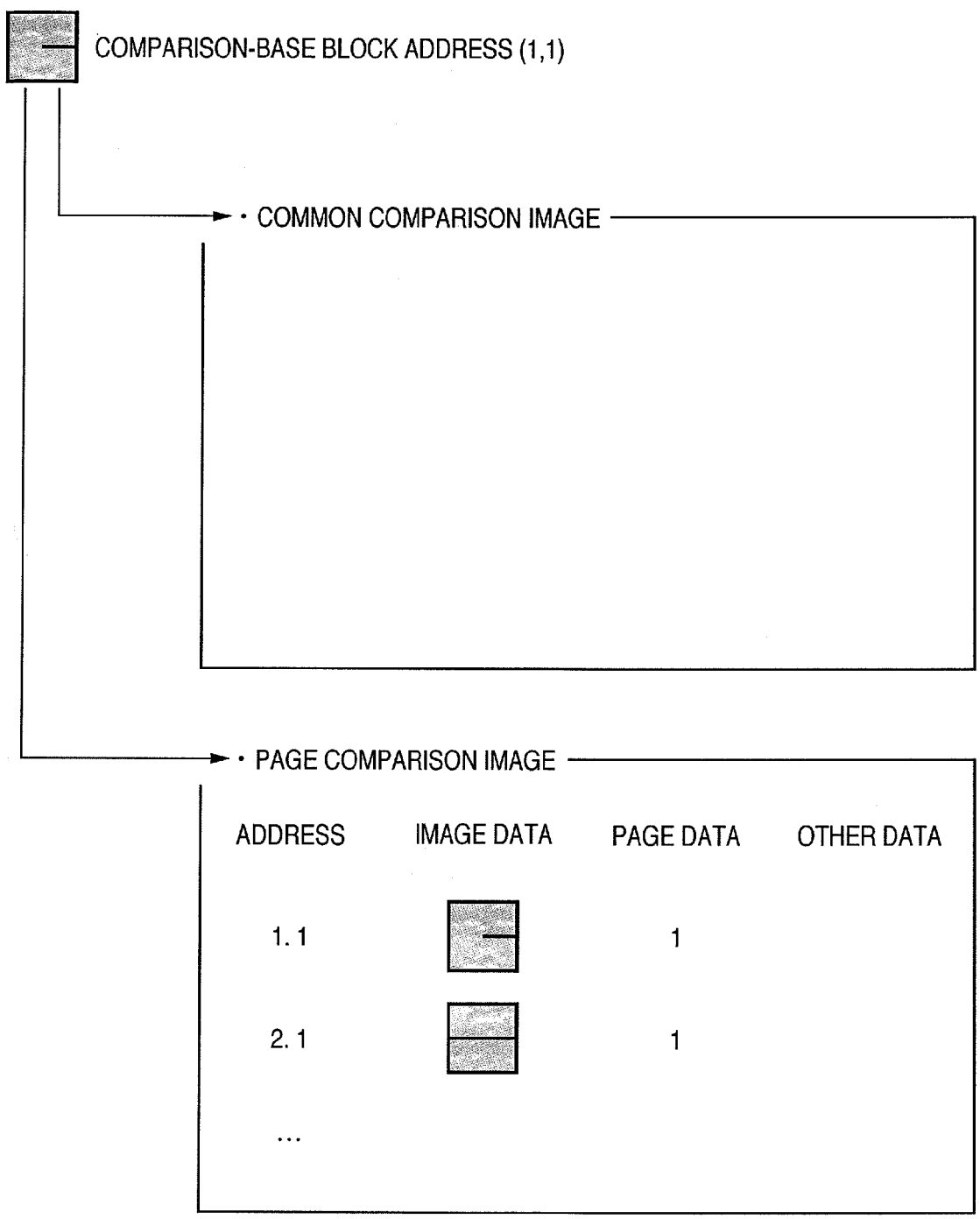
FIG. 21 is an explanatory view of pixel block comparison processing between the first page and second page.

FIG. 21 is an explanatory view of comparison image block acquisition processing. As shown in FIG. 21, all image blocks having the same address as the comparison-base block address are extracted as comparison target data.

In step S305, the image blocks are compared to calculate the similarity level.

First, components Y, Cb and Cr constituting the pixel are extracted from the image block, and a similarity level is calculated for each component. FIG. 22 shows a similarity level calculation formula used for calculating the similarity level of the image blocks. Using the similarity level calculation formula where a similarity level is expressed by a vector's cosine value, the similarity level between the comparison-base image block and the comparison-target image block is calculated in units of pixel component.

In step S306, determination is made as to whether or not to consider the comparing image blocks the same image. Threshold values are set respectively for similarity levels of respective components Y, Cb and Cr. For instance, similarity level 95 or more is set as a threshold value of luminance data Y; and similarity level 90 is set as a threshold value of color difference data Cb and Cr.

When the similarity level of the compared image block data is equal to or larger than the threshold value, the image block is stored as the same image in the common image area in step S307. When the similarity level is less than the threshold value, the image block is stored as a difference image in the page comparison image area in step S308.

In step S307, the image block having a similarity level equal to or larger than the threshold value is stored in the common comparison image area.

If the comparison-target image block exists in the common comparison image area, page data is added to the page data of the corresponding image block address of the common comparison image area. If the comparison-target image block exists in the page comparison image area, the image block data in the page comparison image area is moved to the common comparison image area, and page data of the current comparison-base image block is added.

In step S308, with respect to the image block having a similarity level less than the threshold value, data of the currently processed image block is stored in the page comparison image area.

As has been described above, when the second page is inputted, the image blocks of the first page have all been stored in the page comparison image area. Therefore, processing of steps S304 to S308 is repeated with respect to the image blocks of the inputted second page and the image blocks stored in the comparison image area. As a result, image block data can be stored in the page comparison image area and the common comparison image area shown in FIGS. 23A and 23B.

When the above-described image data comparison processing of the second page is completed, binary image data is generated in step S210 similarly to the first page, thereby registering the second-page image data.

<Processing On Third Page and Subsequent Pages>

With respect to the third page and the subsequent pages, basically the similar processing to that of the second page is performed.

FIG. 24 shows image data of the inputted image of the third page, in which the text region that is the foreground is separated from the background.

Similarly to the data on the second page, the inputted image is divided into image blocks, and the image block data is compared to block data in the comparison image area to calculate the similarity level.

Similarly to the second page, if the similarity level is equal to or larger than the threshold value, the image block data is stored in the common comparison image area; whereas if the similarity level is less than the threshold value, the image block data is stored in the page comparison image area.

In this stage, even if the image block data is not common in all pages, the image block data is still registered in the common comparison image area. For instance, in a case where the image block data is common in the second and third pages but not in the first page, the image block data of the second and third pages is registered in the common comparison image area and the image block data of the first page is left in the page comparison image area.

As described above, as a result of processing on the third-page image data, image block data is stored in the comparison image areas shown in FIGS. 25A and 25B.

When image data comparison processing on the third page is completed, binary image data is generated in step S210 as similar to the first and second pages, and the generated binary image data is registered as the third-page image data.

By repeating the foregoing processing a number of times corresponding to the number of pages, similar processing can be performed on plural pages of image data.

In step S103 in FIG. 3, it is determined based on the status signal from the image scanner 10 whether or not data indicative of no unread original document is received. If comparison processing is completed for all pages, the control proceeds to step S104.

In step S104, the image block data stored in the page comparison image area is added to the page data as respective page information.

The image block data remained in the page comparison image area is page-unique image data. Therefore, the image block data of the same page is extracted to generate image data, and compression processing appropriate for the page image is performed. Then, the generated image data is pasted on the page image as a background of the binary image generated for each page in step S210.

In step S105, image block pasting is performed with respect to all image blocks stored in the page comparison image area. When pasting of all image blocks is completed, common image link generation processing in step S106 is performed.

Figure 26:
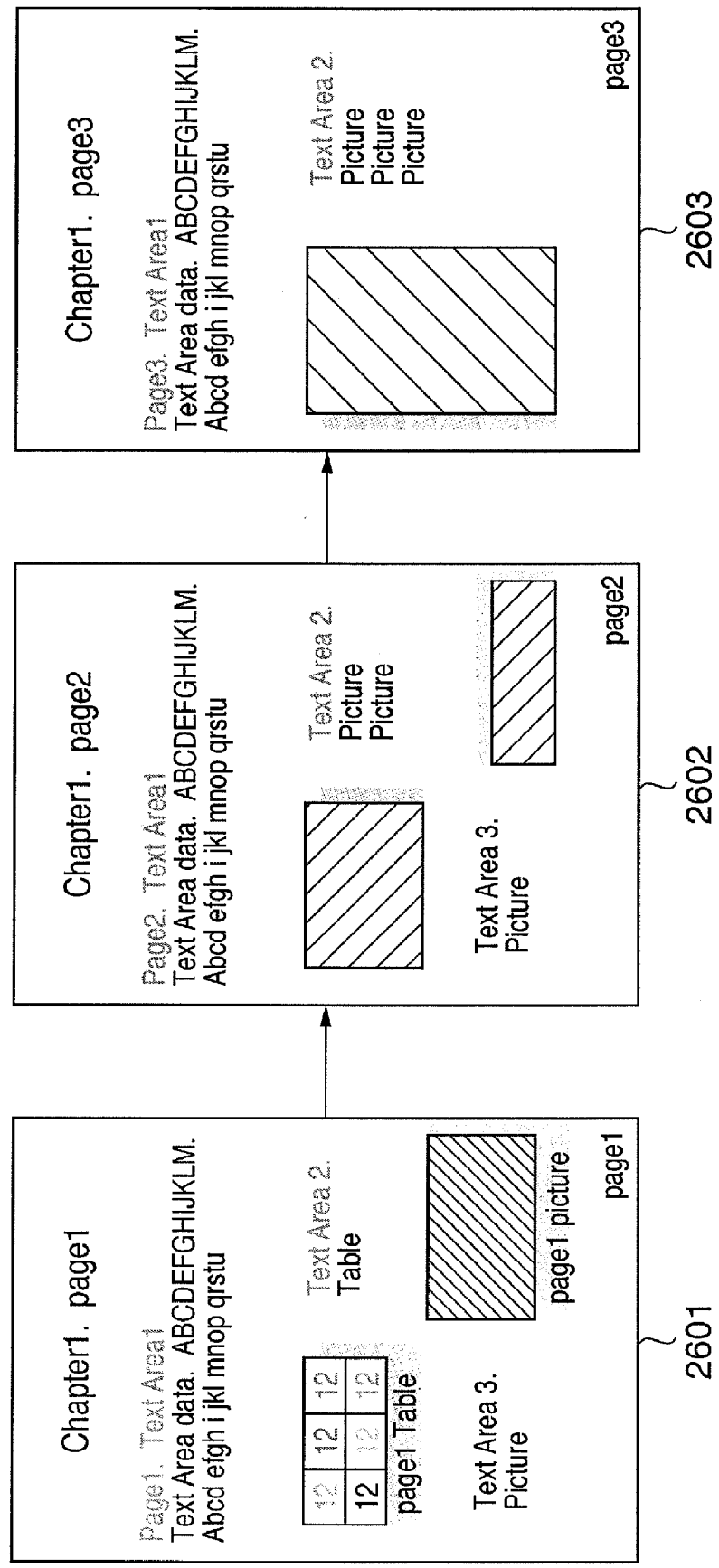
FIG. 26 is a view showing how the page-unique portion is pasted on the first to third pages respectively.

Numerals 2601 to 2603 in FIG. 26 show images of pasting processing on the page image. For each of the page-unique image data, image data pasting is performed as a background image of the binary image extracted as a foreground.

In step S106, common image data is generated from the image block data stored in the common comparison image area and appropriate compression is performed. Since the common image data is multi-valued color image data, a compression technique such as GIF, JPEG and the like may be employed in the compression processing.

Then, pasting is performed as a background of the page image data generated in step S104. The image data generated from the common comparison image area has no tangible data in each page. By generating a link from one tangible data to respective pages, the page image is generated. When the common image data has an absent portion, the image data is complemented by performing filling processing with the peripheral color similarly to the deleted text portion filling processing in step S207.

Figure 27:
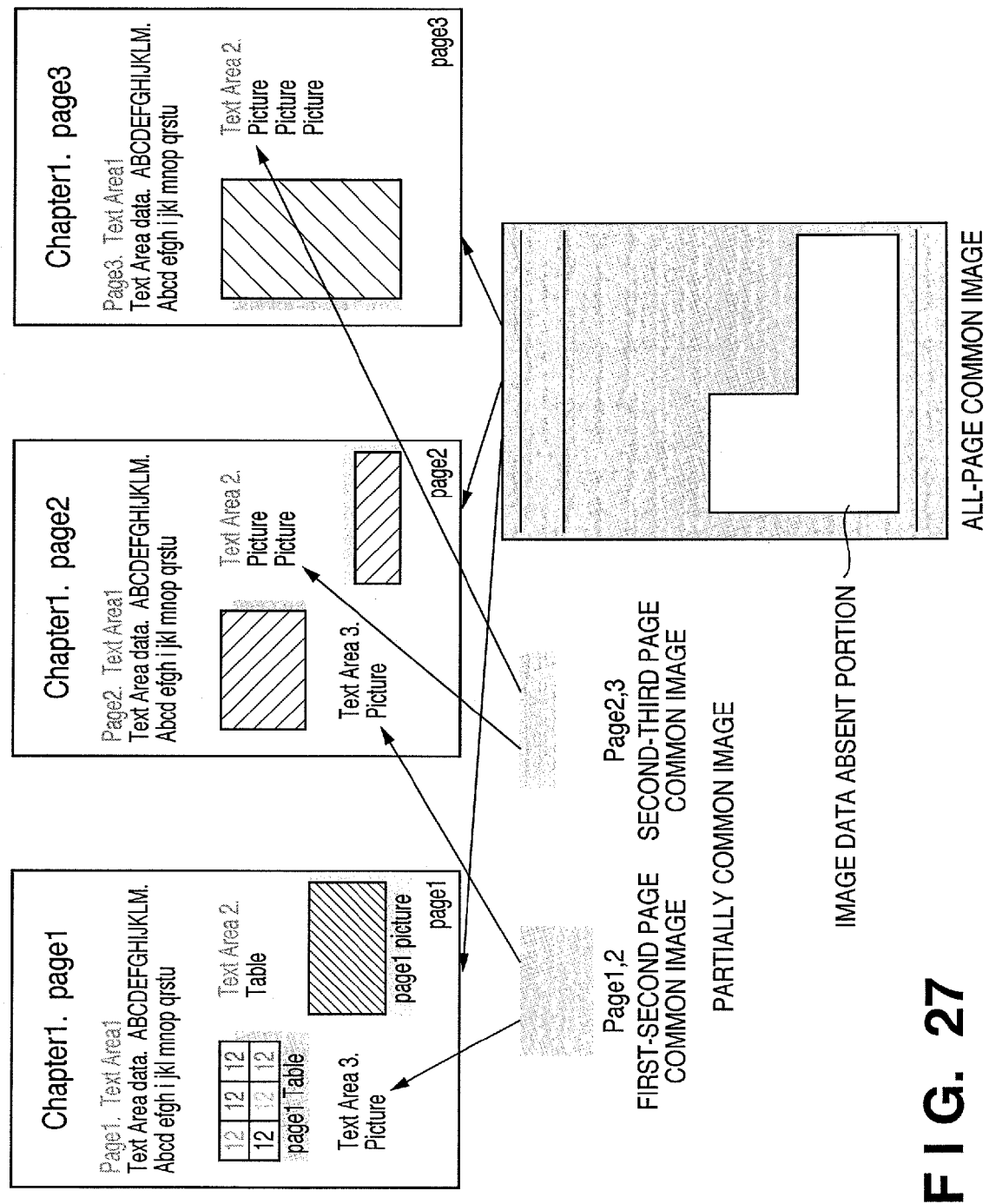
FIG. 27 is a view showing how the common background portion is pasted on the first to third pages respectively.

As shown in FIG. 27, partially common image data and all-page common image data are generated. The partially common image data is pasted as a background of the page image, and then the all-page common image data is superimposed as the background of all image data.

In other words, image data is completed by superimposing images from the background to the foreground, i.e., in order of the all-page common image, the partially common image, the page image, and the binary image.

Figure 28:
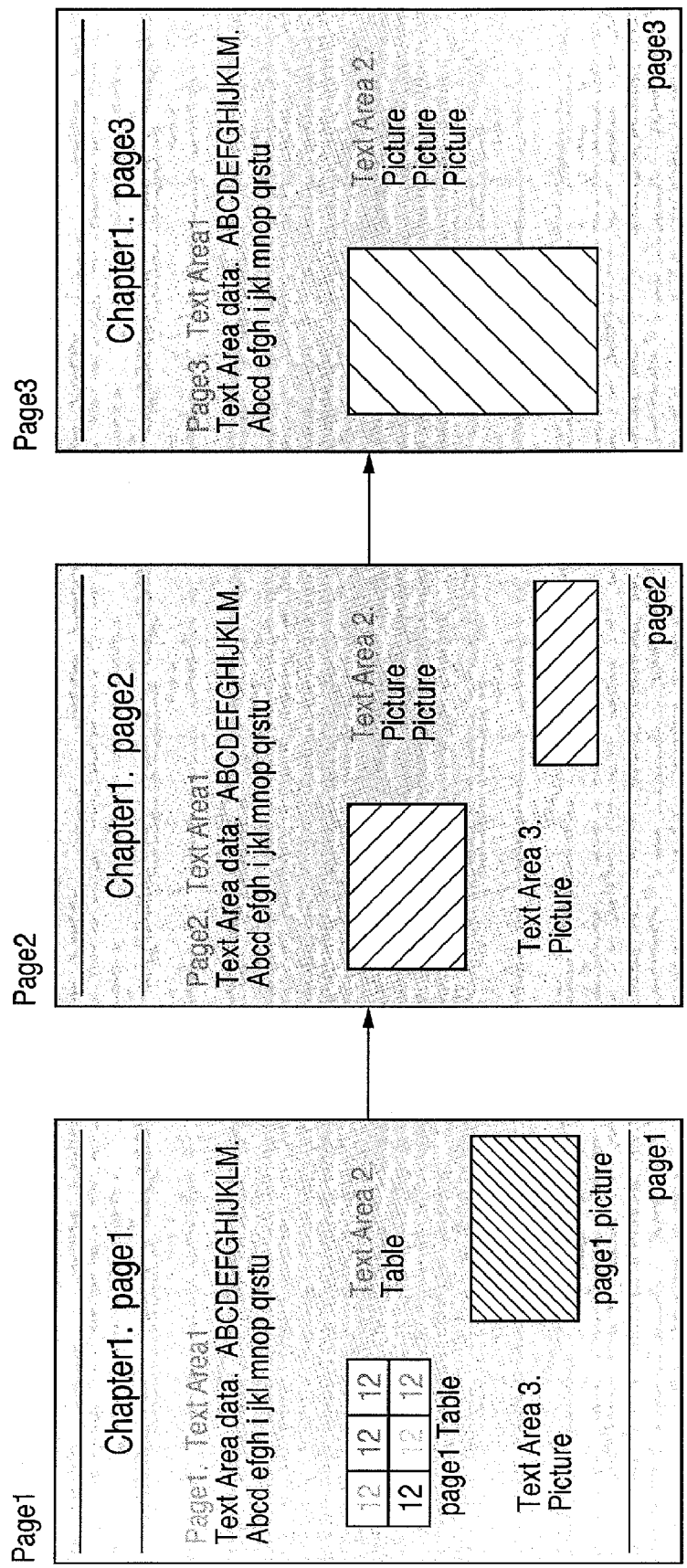
FIG. 28 is a view showing restored images of the first to third pages.

Based on the data obtained by the above processing, a file having a structured document format that can describe plural pages of document (e.g., a PDF file) is generated, and an image file shown in FIG. 28 can be acquired as an output result.

As has been described above, in a case of an original document constructed with plural pages, generating links to respective pages having a common background enables data sharing and further enables reduction in the data amount.

Second Embodiment

In the common background link generation processing in step S106 of the first embodiment, all-page common image data that is common to all pages and partially common image data that is partially common to part of the pages are generated. Then, generated common image data is linked to corresponding pages to generate one page of image data.

The second embodiment pays attention to the partially common image data of the common image block data. With respect to image block data that is common in over 50% of all pages, image data is generated as the all-page common image block.

For instance, first-second page common image data and second-third page common image data shown in FIG. 27, which are the partially common image data, include image data that is common in over 50% of all pages (3 pages). Therefore, these partially common image data can be processed as the all-page common image data.

Figure 29:
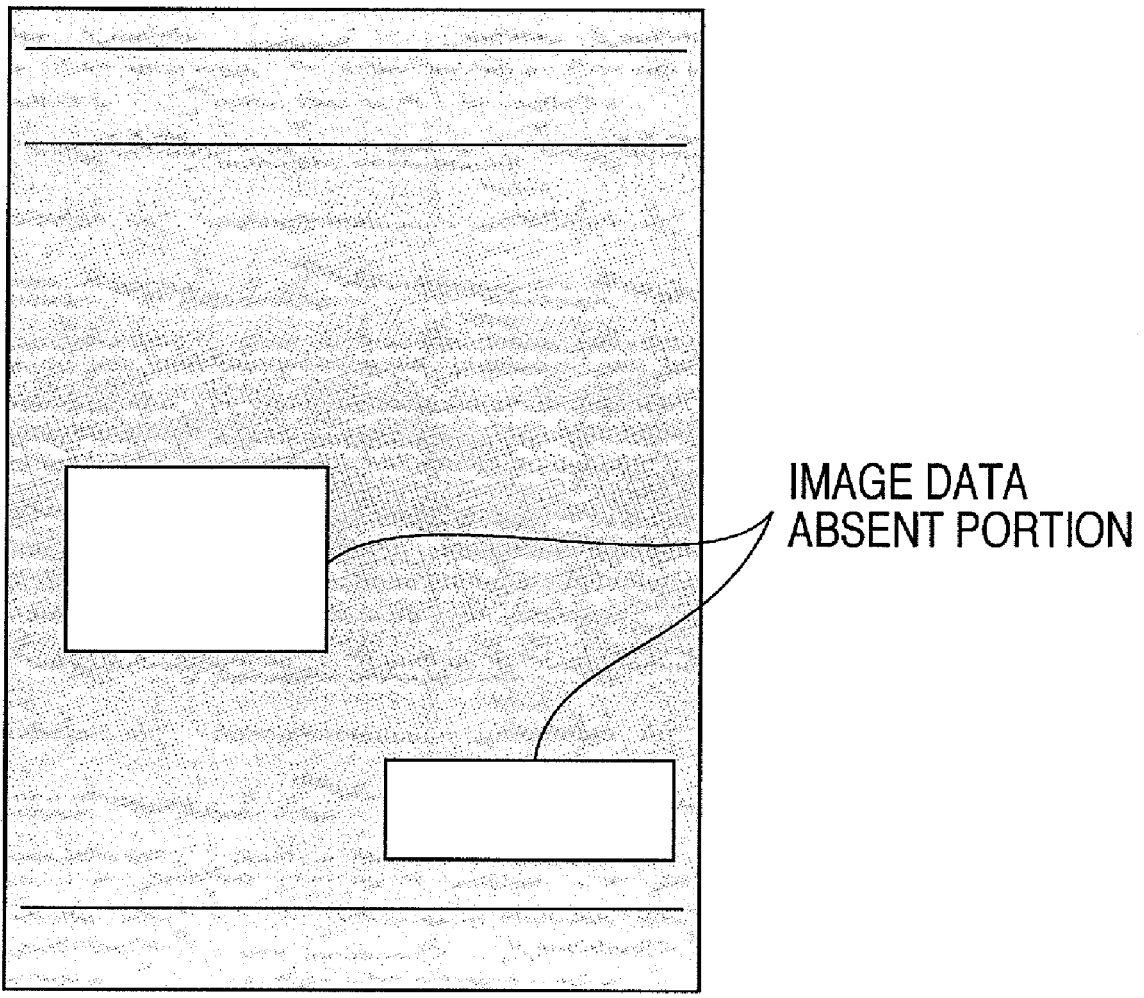
FIG. 29 shows an example of the common background image according to the second embodiment.

Therefore in the case of the second embodiment, image data having links to respective pages is only the common image data as shown in FIG. 29. Therefore, the second embodiment can increase the compression efficiency for the size of the partial image data, compared to the first embodiment. The larger the number of pages to be processed, the more increased effect can be achieved.

Third Embodiment

In the first embodiment, image block data includes image block addresses, image data, and page data.

According to the third embodiment, in addition to the above data, image block data contains information on whether or not filling processing of the foreground has been performed on the image block. When it is determined that a comparison-target image block is the same image block as a comparison-base image block, processing in step S307 is performed. In step S307, the image block is registered in the common comparison image area as common image data. In this stage, an image block which has not been subjected to filling is registered by priority as image data of the image block data.

Figure 30:
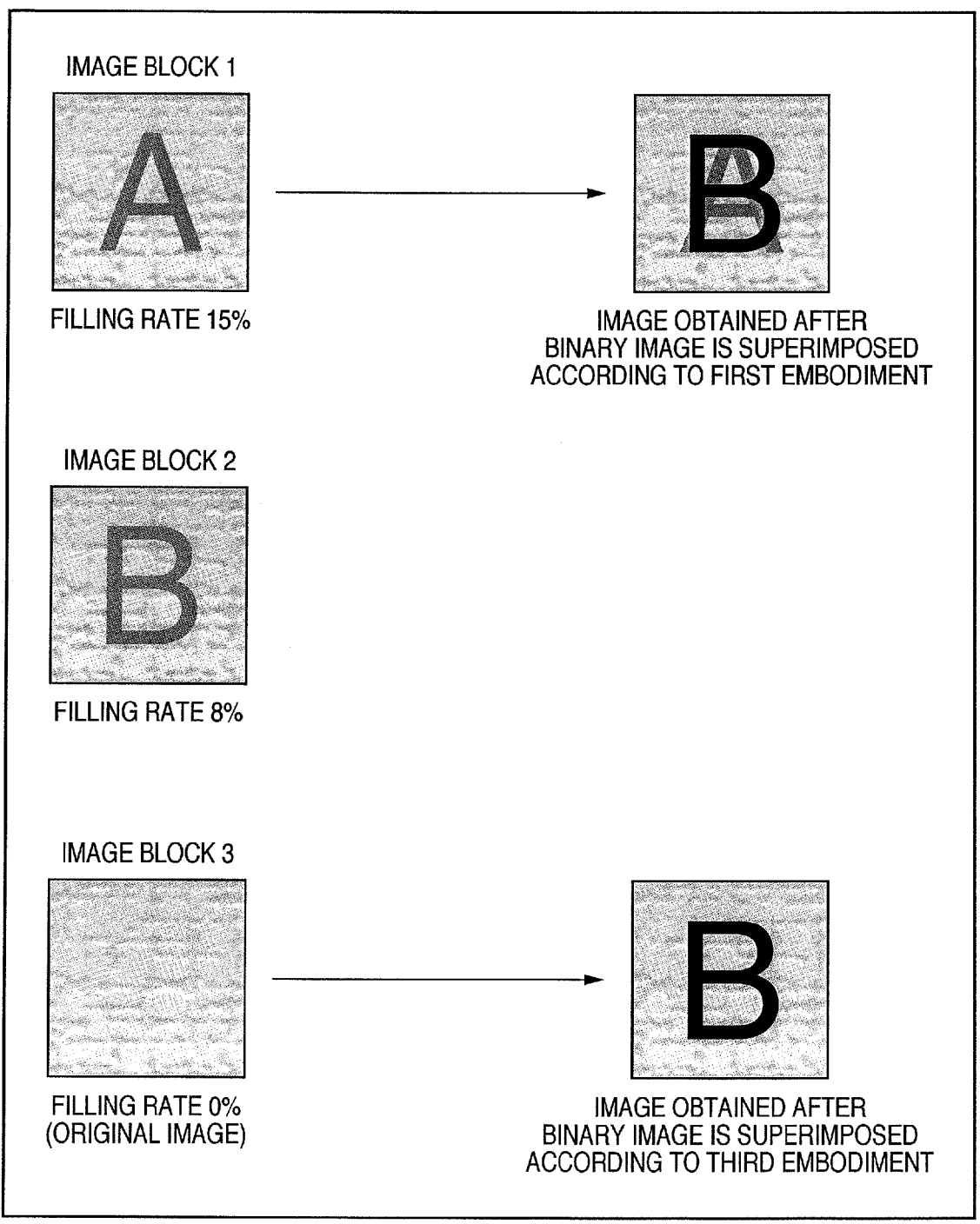
FIG. 30 is an explanatory view of superimposing a binary image on a background image according to the third embodiment.

Furthermore, by containing information on a pixel rate at which filling processing is performed on the image block, image data having a small pixel filling rate is registered in the image block registration in step S307. FIG. 30 is an explanatory view of processing according to the third embodiment.

For instance, in a case where the image blocks 1 and 2 are processed as the same image, the image block 2 having a small filling rate is registered as the image block data. Further in a case where the registered image block and the image block 3 are processed as the same image, the image block 3 having a small filling rate is registered as the image block data.

In the processing according to the first embodiment, in a case of superimposing the text image "B" on the background image that has been subjected to filling, the trace of filling remains to some extent. On the contrary, according to the processing of the third embodiment, since the image of the ultimately acquired image block has the smallest filling rate (close to the original background), the trace of filling does not become conspicuous. Therefore, when the first embodiment is compared with the third embodiment, executing the processing according to the third embodiment can achieve a higher quality image.

Fourth Embodiment

In the image data division processing according to the first embodiment, image block division is performed in units of 16×16 pixels and comparison is performed.

Figure 31:
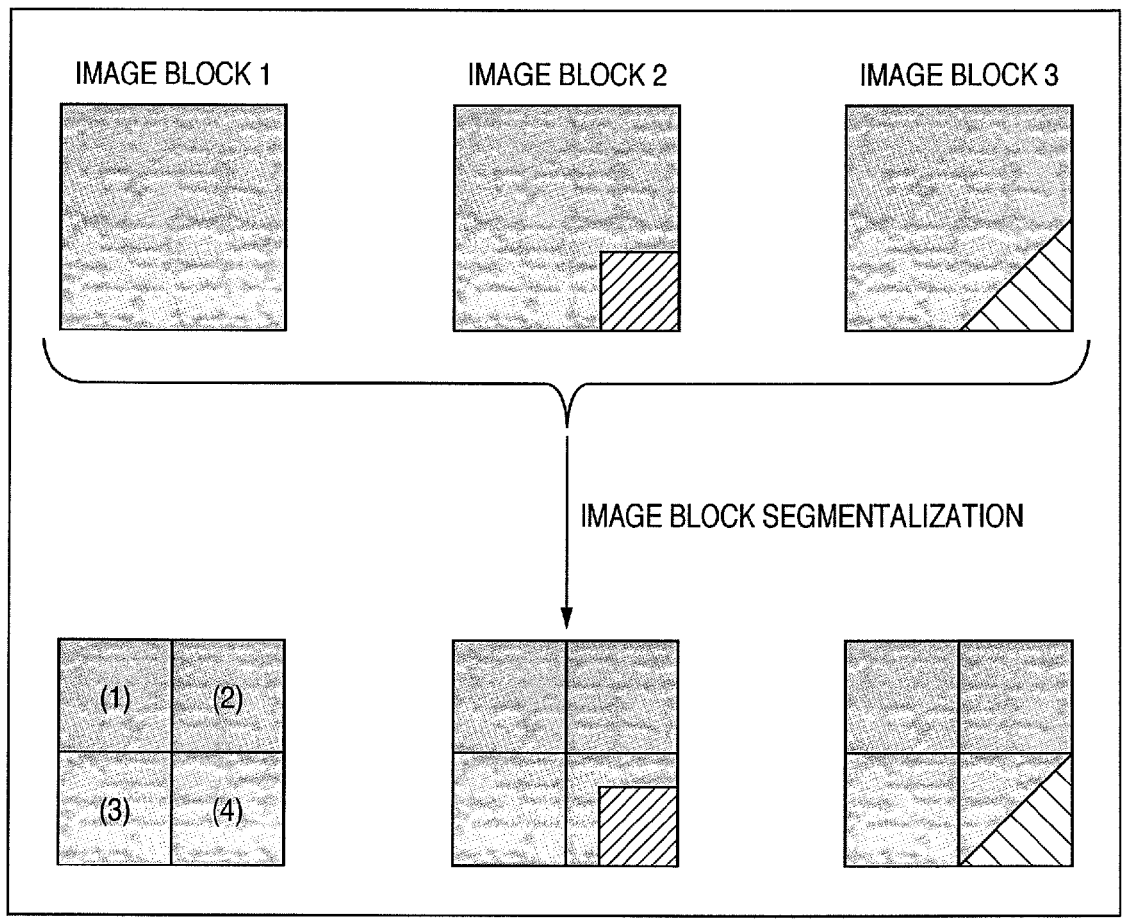
FIG. 31 is an explanatory view of pixel block segmentalization and comparison processing according to the fourth embodiment.

For instance, when the image blocks 1, 2 and 3 shown in FIG. 31 are compared, the comparison result finds the image blocks different. In an extreme case, if 1 out of 256 pixels is different in the 16×16 pixel block, the image blocks are considered different.

In view of this, even in a case where the image block comparison processing does not find image blocks the same, if the image blocks have a certain similarity, the fourth embodiment adds processing of further segmentalizing the image blocks and comparing the blocks again.

In FIG. 31, assume that the similarity level of image blocks 1 and 2 is 70%, the similarity level of image blocks 1 and 3 is 70%, and the similarity level of image blocks 2 and 3 is 80%. Assuming that the threshold value of the same-image-block determination is 90%, the image blocks 1, 2, and 3 are all recognized as different images.

According to the fourth embodiment, if the similarity level of image blocks is, e.g., 70% or more, the image blocks are further segmentalized to determine whether or not they are the same image block.

For instance, as shown in FIG. 31, the pixel block having the size of 16×16 pixels is segmentalized to image blocks having 8×8 pixels, and each of the segmentalized image blocks is reevaluated. As a result, segmentalized block regions 1, 2, and 3 of the pixel block 2 can be determined the same as the corresponding regions 1, 2, and 3 of the pixel block 1. Therefore, only the region 4 is stored with respect to the pixel block 2.

As described above, in the image block comparison processing that finds similar image blocks different according to the first embodiment, ¾ of the blocks are recognized as common images according to the fourth embodiment. As a result, recognition rate improves.

If the segmentalization processing is further segmentalized to the level of pixel unit, only the portion that has failed in filling processing is extracted as a page image as shown in FIG. 32, and remaining image data can be stored as common image data.

Preferred embodiments of the present invention have been provided above. Many of the processing described in the embodiments are realized by a computer program executed on a data processing apparatus. Naturally, the present invention includes such computer program. Furthermore, normally the computer program is stored in a computer-readable storage medium such as CD-ROM, and becomes executable by setting the storage medium in a computer, then copying or installing to the system. Therefore, the present invention also includes such computer-readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-347934 filed Dec. 1, 2005, which is hereby incorporated by reference herein in its entirety.

What is claimed is:

1. An image processing apparatus that performs compression coding on a plurality of page images and generates an electronic file, comprising:
    an input unit configured to input the plurality of page images;
    a first separation unit configured to separate each of the plurality of page images into a text image and a background image;
    a first compression coding unit configured to perform binarization on the separated text images to which the plurality of page images have been separated by the first separation unit, and perform compression coding appropriate for binary images on each of the binarized text images;

a second separation unit configured to further separate each of the separated background images, to which the plurality of page images have been separated by the first separation unit, into a common background image portion and page-unique background image portions by comparing the separated background images to which the plurality of page images have been separated by the first separation unit, wherein the common background image portion is a common portion between the separated background images, and wherein each of the page-unique background image portions is not common to the separated background images;

a second compression coding unit configured to perform compression coding appropriate for multi-valued images on the common background image portion and the page-unique background image portions; and a file generation unit configured to generate the electronic file that can describe plural pages, by associating each page with the compression coded data of the text image of the each page, the compression coded data of the page-unique background image portion and a link to the compression coded data of the common background image portion, wherein the compression coded data of the common background image portion is linked to the plurality pages in the generated electronic file.

2. The image processing apparatus according to claim 1, wherein said first separation unit separates the text image in units of color.

3. The image processing apparatus according to claim 1, wherein said first separation unit generates the separated background image by filling a pixel region, where significant pixels have existed as a text image, with a color pixel value of a peripheral background image, and wherein said second separation unit further separates the background images, that have been generated by said first separation unit, into the common background image portion and the page-unique background image portions.

4. The image processing apparatus according to claim 1, wherein said second separation unit includes a difference calculation unit configured to divide a background image of each page into a block having a size of n×m pixels and calculate a difference value between pixel blocks of a same position on respective pages, wherein if it is determined that the difference value obtained by said difference calculation unit falls within a first allowable range, a pixel block of interest is determined as a pixel block constructing the common background image portion, whereas if it is determined that the difference value exceeds a predetermined allowable range, the pixel block of interest is determined as a pixel block constructing the page-unique background image portion, thereby categorizing each pixel block.

5. The image processing apparatus according to claim 4, wherein said second separation unit segmentalizes a pixel block that has been determined that the difference value exceeds the allowable range, and if it is determined that a difference value between segmentalized blocks falls within a second allowable range, the segmentalized block is determined as a pixel block constructing the common background image portion, whereas if it is determined that the difference value exceeds the allowable range, the segmentalized block is determined as a pixel block constructing the page-unique background image portion, thereby categorizing each pixel block.

6. A control method of an image processing apparatus that performs compression coding on a plurality of page images and generates an electronic file, comprising:

an input step of inputting the plurality of page images;

a first separation step of separating each of a plurality of page images into a text image and a background image;

a first compression coding step of performing binarization on the separated text images to which the plurality of page images have been separated in said first separation step, and performing compression coding appropriate for binary images on each of the binarized text images;

a second separation step of further separating each of the separated background images, to which the plurality of page images have been separated in said first separation step, into a common background image portion and page-unique background image portions by comparing the separated background images to which the plurality of page images have been separated in said first separation step, wherein the common background image portion is a common portion between the separated background images, and wherein each of the page-unique background image portions is not common to the separated background images;

a second compression coding step of performing compression coding appropriate for multi-valued images on the common background image portion and the page-unique background image portions; and a file generation step of generating one electronic file that can describe plural pages, by associating each page with the compression coded data of the text image of the each page, the compression coded data of the page-unique background image portion and a link to the compression coded data of the common background image portion, wherein the compression coded data of the common background image portion is linked to the plurality pages in the generated electronic file.

7. A non-transitory computer-readable storage medium with an executable program stored thereon, wherein the program instructs a microprocessor to perform:

a first separation step of separating each of a plurality of page images into a text image and a background image;

a first compression coding step of performing binarization on the separated text images to which the plurality of page images have been separated in said first separation step, and performing compression coding appropriate for binary images on each of the binarized text images;

a second separation step of further separating each of the separated background images, to which the plurality of page images have been separated in said first separation step, into a common background image portion and page-unique background image portions by comparing the separated background images to which the plurality of page images have been separated in said first separation step, wherein the common background image portion is a common portion between the separated background images, and wherein each of the page-unique background image portions is not common to the separated background images;

a second compression coding step of performing compression coding appropriate for multi-valued images on the common background image portion and the page-unique background image portions; and a file generation step of generating one electronic file that can describe plural pages, by associating each page with the compression coded data of the text image of the each page, the compression coded data of the page-unique background image portion and a link to the compression coded data of the common background image portion, wherein the compression coded data of the common background image portion is linked to the plurality pages in the generated electronic file.

* * * * *